(12) United States Patent
DeVille et al.

(10) Patent No.: US 12,399,608 B2
(45) Date of Patent: *Aug. 26, 2025

(54) FOOD MANAGEMENT SYSTEM

(71) Applicant: Duke Manufacturing Co., St. Louis, MO (US)

(72) Inventors: Canyon DeVille, Lake St. Louis, MO (US); Joshua Lee Loy, New Martinsville, WV (US); Ord Lief Delaney, Vienna, WV (US); Norman J. Bernard, Pampanga (PH); Anthony Horton, Manila (PH)

(73) Assignee: DUKE MANUFACTURING CO., St. Louis, MO (US)

( * ) Notice: Subject to any disclaimer, the term of this patent is extended or adjusted under 35 U.S.C. 154(b) by 272 days.

This patent is subject to a terminal disclaimer.

(21) Appl. No.: 18/159,701

(22) Filed: Jan. 26, 2023

(65) Prior Publication Data

US 2023/0168798 A1    Jun. 1, 2023

Related U.S. Application Data

(63) Continuation of application No. 15/055,346, filed on Feb. 26, 2016, now Pat. No. 11,592,975, which is a
(Continued)

(51) Int. Cl.
*G06F 3/04847* (2022.01)
*G05B 15/02* (2006.01)
(Continued)

(52) U.S. Cl.
CPC ........ *G06F 3/04847* (2013.01); *G05B 15/02* (2013.01); *G06F 3/0481* (2013.01);
(Continued)

(58) Field of Classification Search
CPC ...... G06Q 50/12; G06Q 10/06; G06Q 10/087; Y02B 90/244; G05B 15/02; G06F 3/0481;
(Continued)

(56) References Cited

U.S. PATENT DOCUMENTS

| 4,036,995 A | 7/1977 | Koether et al. |
| 4,054,778 A | 10/1977 | Wollich |

(Continued)

FOREIGN PATENT DOCUMENTS

| DE | 102011001066 A1 | 9/2012 |
| EP | 0849536 A1 | 6/1998 |

(Continued)

*Primary Examiner* — Eric J Yoon
(74) *Attorney, Agent, or Firm* — Stinson LLP

(57) ABSTRACT

Systems and methods for managing food processing and inventory. Food inventory held at food holding locations can be monitored. Food can be transferred among holding locations and served from holding locations. A prioritized food type list indicates food types to be processed and lists food types in order of determined priority. Food may be transferred to default destination holding locations. Food may be
(Continued)

moved to and served from primary holding locations. Buttons associated with holding location displays can be actuated by different types of user engagement for executing various food management operations.

62 Claims, 18 Drawing Sheets

Related U.S. Application Data continuation of application No. PCT/US2014/052956, filed on Aug. 27, 2014.

(60) Provisional application No. 61/870,675, filed on Aug. 27, 2013.

(51) Int. Cl.
| | | |
|---|---|---|
| *G06F 3/0481* | (2022.01) | |
| *G06F 3/04886* | (2022.01) | |
| *G06Q 10/087* | (2023.01) | |
| *G06Q 30/06* | (2023.01) | |
| *G06Q 50/12* | (2012.01) | |

(52) U.S. Cl.
CPC ....... *G06F 3/04886* (2013.01); *G06Q 10/087* (2013.01); *G06Q 30/06* (2013.01); *G06Q 50/12* (2013.01)

(58) Field of Classification Search
CPC ............. G06F 3/04842; G06F 3/04817; G06F 3/0487; G06F 3/0488; G06F 3/04886; G06F 3/04847
See application file for complete search history.

(56) References Cited

U.S. PATENT DOCUMENTS

| | | |
|---|---|---|
| 4,244,284 A | 1/1981 | Flavan, Jr. et al. |
| 4,383,823 A | 5/1983 | Williams et al. |
| 4,401,884 A | 8/1983 | Kusunoki et al. |
| 4,458,140 A | 7/1984 | Belinkoff |
| RE31,833 E | 2/1985 | Loeffler et al. |
| 4,499,357 A | 2/1985 | Kojima |
| 4,626,662 A | 12/1986 | Woolf |
| 4,633,065 A | 12/1986 | Takazume et al. |
| 4,727,799 A | 3/1988 | Ohshima et al. |
| 4,812,963 A | 3/1989 | Albrecht et al. |
| 4,818,547 A | 4/1989 | Miwa et al. |
| 4,922,435 A | 5/1990 | Cahlander et al. |
| 5,132,914 A | 7/1992 | Cahlander et al. |
| 5,134,263 A | 7/1992 | Smith et al. |
| 5,171,974 A | 12/1992 | Koether et al. |
| 5,172,328 A | 12/1992 | Cahlander et al. |
| 5,221,817 A | 6/1993 | Ota |
| 5,373,142 A | 12/1994 | Ohshima et al. |
| 5,530,229 A | 6/1996 | Gong et al. |
| 5,539,671 A | 7/1996 | Albrecht et al. |
| 5,607,611 A | 3/1997 | Lee |
| 5,693,247 A | 12/1997 | Bu et al. |
| 5,711,160 A | 1/1998 | Namisniak et al. |
| 5,712,464 A | 1/1998 | Westerberg |
| 5,736,716 A | 4/1998 | Westerberg |
| 5,859,639 A | 1/1999 | Ebrahim |
| 5,875,430 A | 2/1999 | Koether |
| 6,011,243 A | 1/2000 | Arnold et al. |
| 6,026,372 A | 2/2000 | Savage |
| 6,066,839 A | 5/2000 | Park |
| 6,079,401 A | 6/2000 | Alvord et al. |
| 6,175,099 B1 | 1/2001 | Shei et al. |
| 6,298,331 B1 | 10/2001 | Walker et al. |
| 6,299,920 B1 | 10/2001 | Saksena |
| 6,299,921 B1 | 10/2001 | Löffler et al. |
| 6,315,039 B1 | 11/2001 | Westbrooks et al. |
| 6,541,739 B2 | 4/2003 | Shei et al. |
| 6,658,994 B1 | 12/2003 | McMillan |
| 6,759,635 B2 | 7/2004 | Lile |
| 6,777,009 B1 | 8/2004 | Shealy |
| 6,801,228 B2 | 10/2004 | Kargman |
| 6,802,367 B1 | 10/2004 | Westbrooks, Jr. et al. |
| 6,818,865 B2 | 11/2004 | Mangina |
| 6,866,417 B2 | 3/2005 | Gunawardena et al. |
| 6,922,652 B2 | 7/2005 | Edwards et al. |
| 6,976,004 B2 | 12/2005 | Wittrup |
| 6,987,250 B2 | 1/2006 | Levy et al. |
| 7,038,172 B1 | 5/2006 | Stuck |
| 7,105,779 B2 | 9/2006 | Shei |
| 7,132,926 B2 | 11/2006 | Vaseloff et al. |
| 7,141,258 B2 | 11/2006 | Hillmann |
| 7,202,454 B2 | 4/2007 | Wiedemann et al. |
| 7,227,102 B2 | 6/2007 | Shei |
| 7,231,871 B1 | 6/2007 | Wilbers |
| 7,232,062 B1 | 6/2007 | Salerno |
| 7,258,064 B2 | 8/2007 | Vaseloff et al. |
| 7,328,654 B2 | 2/2008 | Shei |
| 7,385,160 B2 | 6/2008 | Jones |
| 7,516,692 B2 | 4/2009 | Pirkle et al. |
| 7,605,349 B2 | 10/2009 | Gaynor et al. |
| 7,628,108 B2 | 12/2009 | Vaseloff et al. |
| 7,633,485 B2 | 12/2009 | Reed et al. |
| 7,680,691 B2 | 3/2010 | Kimball et al. |
| 7,750,272 B2 | 7/2010 | Furlanetto et al. |
| 7,820,947 B2 | 10/2010 | Gaynor et al. |
| RE42,077 E | 1/2011 | Savage |
| 7,897,188 B2 | 3/2011 | Wilbers |
| 7,953,632 B2 | 5/2011 | Salerno |
| 7,973,642 B2 | 7/2011 | Schackmuth et al. |
| 8,136,442 B2 | 3/2012 | Strutin-Belinoff et al. |
| 8,193,474 B2 | 6/2012 | Harris |
| 8,209,219 B2 | 6/2012 | Fitzpatrick et al. |
| 8,258,440 B2 | 9/2012 | Shei et al. |
| 8,338,756 B2 | 12/2012 | Shei et al. |
| 8,372,350 B2 | 2/2013 | Amedeo et al. |
| 8,624,169 B1 | 1/2014 | Sorenson et al. |
| 8,712,851 B2 | 4/2014 | Koether et al. |
| 2004/0056761 A1 | 3/2004 | Vaseloff et al. |
| 2005/0103212 A1 | 5/2005 | Cronin et al. |
| 2005/0168435 A1* | 8/2005 | Reed ............... B60K 35/10 345/156 |
| 2005/0211775 A1 | 9/2005 | Vaseloff et al. |
| 2005/0251450 A1 | 11/2005 | Koether et al. |
| 2006/0185527 A1 | 8/2006 | Shei |
| 2007/0108178 A1 | 5/2007 | Jones |
| 2007/0214053 A1 | 9/2007 | Salerno |
| 2007/0251521 A1 | 11/2007 | Schackmuth |
| 2007/0254080 A1 | 11/2007 | Schackmuth et al. |
| 2008/0034301 A1* | 2/2008 | Awiszus ............... G06Q 10/02 715/763 |
| 2008/0181992 A1 | 7/2008 | Willett |
| 2008/0276203 A1 | 11/2008 | Santinato et al. |
| 2008/0295702 A1 | 12/2008 | Weidemann et al. |
| 2008/0319864 A1 | 12/2008 | Leet |
| 2009/0248530 A1 | 10/2009 | Ito |
| 2010/0138007 A1 | 6/2010 | Clark et al. |
| 2010/0140251 A1 | 6/2010 | Shei et al. |
| 2010/0140252 A1 | 6/2010 | Shei et al. |
| 2010/0147823 A1 | 6/2010 | Anderson et al. |
| 2010/0161431 A1 | 6/2010 | Koether et al. |
| 2010/0274633 A1 | 10/2010 | Scrivano et al. |
| 2011/0004502 A1* | 1/2011 | Dillard ............... G06Q 10/06 705/7.34 |
| 2011/0083564 A1 | 4/2011 | Kirby et al. |
| 2011/0311690 A1 | 12/2011 | Franzolin |
| 2012/0003364 A1 | 1/2012 | Kling et al. |
| 2012/0226977 A1* | 9/2012 | Lengeling ........... G06F 3/04883 715/702 |
| 2012/0260217 A1 | 10/2012 | Celebisoy |
| 2012/0288595 A1 | 11/2012 | Randall et al. |
| 2012/0326345 A1 | 12/2012 | Gendre et al. |
| 2013/0092032 A1 | 4/2013 | Cafferty et al. |
| 2013/0113822 A1* | 5/2013 | Putrevu ............... G06F 40/103 345/619 |
| 2013/0171304 A1 | 7/2013 | Huntley |

(56) References Cited

U.S. PATENT DOCUMENTS

| | | | |
|---|---|---|---|
| 2013/0177683 A1 | 7/2013 | Shei et al. | |
| 2013/0249814 A1* | 9/2013 | Zeng | G06F 3/04817 |
| | | | 345/173 |
| 2013/0269539 A1 | 10/2013 | Polt | |
| 2014/0150461 A1 | 6/2014 | Veltrop | |
| 2014/0164153 A1 | 6/2014 | Koether et al. | |
| 2014/0201688 A1 | 7/2014 | Guilleminot et al. | |
| 2015/0007099 A1* | 1/2015 | Bernaudin | G06F 3/0484 |
| | | | 715/783 |
| 2015/0331395 A1 | 11/2015 | Hepperla et al. | |

FOREIGN PATENT DOCUMENTS

| | | |
|---|---|---|
| EP | 1228465 A1 | 8/2002 |
| IE | 20060537 A1 | 2/2008 |
| JP | S59138816 A | 8/1984 |
| JP | H05108672 A | 4/1993 |
| JP | H1130425 A | 2/1999 |
| JP | 2001125981 A | 5/2001 |
| JP | 2006075196 A | 3/2006 |
| JP | 2006263020 A | 10/2006 |
| JP | 2009178358 A | 8/2009 |
| JP | 2010061276 A | 3/2010 |
| JP | 2011125258 A | 6/2011 |
| KR | 20000037570 A | 7/2000 |
| WO | 2007036582 A2 | 4/2007 |
| WO | 2011004317 A1 | 1/2011 |
| WO | 2015171630 A4 | 11/2015 |

* cited by examiner

OVEN
―――――――
8  ROLL
7  COOKIE
5  BISC

| OVEN | |
|---|---|
| 9 | COOKIE |
| 8 | ROLL |
| 5 | BISC |

OVEN

10 COOKIE
8   ROLL
5   BISC

FOOD MANAGEMENT SYSTEM

CROSS-REFERENCE TO RELATED APPLICATIONS

This application is a continuation of U.S. patent application Ser. No. 15/055,346 filed Feb. 26, 2016, which claims priority to PCT Patent Application No. PCT/US2014/052956 filed Aug. 27, 2014, which claims priority to U.S. Patent Application No. 61/870,675 filed Aug. 27, 2013, each of which is hereby incorporated by reference in its entirety.

FIELD OF THE INVENTION

The present invention generally relates to food management and more particularly to systems, apparatus, and methods for managing food in food preparation establishments such as restaurants, including quick service restaurants.

BACKGROUND

The success of restaurants depends in large part on speed of customer service and quality of food served to customers. Speed of service may be improved by forecasting or predicting food that will be ordered in the future and preparing food before it is ordered. For example, food may be prepared by cooking it (e.g., by baking, frying, broiling, etc.) and then holding it in a condition suitable for serving in anticipation of the food being ordered by a customer. It is desirable to monitor inventory of cooked food to ensure it is served to customers within a time period during which it is suitable for serving and discarded or wasted if the food has not been served before that time period expires. Some systems for food management for restaurants are known. For example, certain systems are disclosed in U.S. Pat. Nos. 7,232,062, 7,258,064, and 7,953,632, which are hereby incorporated by reference in their entireties.

SUMMARY

One aspect of the present invention is directed to a food management control system for managing food in a food holding apparatus having at least a first holding location and a second holding location for holding food of a first food type. The food management control system includes a food management controller configured for monitoring food expiration times associated with the first and second holding locations. A point of sale device is configured for receiving customer orders and for generating a customer order signal representative of a customer order for an amount of the first food type. The food management control system also includes a user interface including at least first and second holding location displays for displaying information associated with the respective first and second holding locations. The food management control system also includes a tangible storage medium having food management controller executable instructions stored therein. The instructions, when executed by the food management controller, display on the first and second holding location displays food amount indicators representing an amount of food held at the respective holding locations. The tangible storage medium stores food management controller executable instructions for displaying a first food status indicator on one of the first and second holding location displays indicating food held at the holding location associated with said one of the first and second holding location displays should be served first relative to food held at the holding location associated with the other of the first and second holding location displays. The food management controller is in operative communication with the point of sale device for receiving the customer order signal, and the food management controller is responsive to the customer order signal to change the food amount indicator displayed on said one of the first and second holding location displays to represent a reduced amount of food of the first food type held in said one of the first and second holding locations.

Another aspect of the present invention is directed to a food management control system for managing food in a food holding apparatus. The food holding apparatus has a plurality of food holding locations including at least an origin holding location and a destination holding location for receiving food transferred from the origin location. The food management control system includes a food management controller configured for managing an inventory of food and monitoring hold times associated with the food holding locations including the origin and destination holding locations. The food management control system includes a tangible storage medium storing a data structure identifying a hold time as being associated with the origin holding location. The tangible storage medium includes food management controller executable instructions stored therein. The instructions, when executed by the food management controller, identifying the destination holding location as a default destination holding location among the plurality of food holding locations. The tangible storage medium includes food management controller executable instructions for executing a default transfer in which the food management controller modifies the data structure to identify the hold time as being associated with the default destination holding location.

Another aspect of the present invention is directed to a computer executable method for use with food holding apparatus having a plurality of food holding locations including at least an origin holding location and a destination holding location to which food from the origin holding location can be transferred. The method includes storing a data structure in a tangible storage medium identifying a hold time as being associated with the origin holding location, monitoring, with a food management controller, the hold time associated with the origin holding location, and referencing, with the food management controller, instructions stored in the tangible storage medium identifying a holding location among the plurality of the holding locations as a default holding location for receiving the hold time in a default transfer. The method further includes executing, with the food management controller, instructions stored in the tangible storage medium to execute the default transfer including modifying the data structure to identify the hold time as being associated with the default destination holding location.

Another aspect of the present invention is directed to a food management control system for managing food in a food holding apparatus. The food holding apparatus has at least a first holding location and a second holding location. The food management control system includes a food management controller configured for monitoring hold times associated with the first and second holding locations. The food management control system includes a user interface including at least first and second holding location displays for displaying information associated with the respective first and second holding locations. The first and second holding location displays are arranged in an array corresponding to an arrangement of the respective first and second holding locations. The first and second holding location displays are positioned in the array corresponding to positions of the respective first and second holding locations in the arrangement. A tangible storage medium stores a data structure identifying the first holding location as a primary holding location. The tangible storage medium has food management controller executable instructions stored therein. The instructions, when executed by the food management controller, display a primary holding location indicator on the first holding location display for distinguishing the first holding location from the second holding location as the primary holding location. The primary holding location indicator indicates to a user to place food at the first holding location instead of the second holding location when the first and second holding locations are not holding food and to transfer food from the second holding location to the first holding location if the first holding location is not holding food.

Another aspect of the present invention is directed to a restaurant food management control system for managing an inventory of cooked food. The restaurant food management control system includes a user interface for displaying a cook list of food types to be cooked for adding to the inventory of cooked food. The restaurant food management control system includes food management controller configured for managing the inventory of cooked food, monitoring a need for cooked food, and determining food types needed to be cooked. The restaurant food management control system includes a tangible storage medium storing the cook list. The tangible storage medium has food management controller executable instructions stored therein. The instructions, when executed by the food management controller, determine a priority for each food type on the cook list as a function of an amount of food of that food type in the inventory and an amount of food of that food type needed to be cooked. The tangible storage medium has food management controller executable instructions that, when executed by the food management controller, modify the cook list to arrange the food types on the cook list in order of the determined priority.

Another aspect of the present invention is directed to a food management control system for managing an inventory of processed food. The food management control system includes a user interface for displaying a prioritized food type list of food types to be processed for adding to the inventory of processed food. The food management control system includes a food management controller configured for managing the inventory of processed food, monitoring a need for processed food, and determining food types needed to be processed. The food management control system includes a tangible storage medium storing the prioritized food type list. The tangible storage medium has food management controller executable instructions stored therein. The instructions, when executed by the food management controller, determine a priority for each food type on the prioritized food type list as a function of an amount of food of that food type in the inventory and an amount of food of that food type needed to be processed. The tangible storage medium has food management controller executable instructions for modifying the prioritized food type list to arrange the food types on the prioritized food type list in order of the determined priority.

Another aspect of the present invention is directed to a food management system for managing food in a food holding apparatus having a plurality of holding locations. The food management system includes a food management controller configured for monitoring a status of the plurality of holding locations. The food management system includes a user interface including a plurality of holding location displays associated with respective holding locations for displaying information associated with the holding locations. The holding location displays are arranged in an array corresponding to an arrangement of the respective holding locations. The holding location displays are positioned in the array corresponding to positions of the respective holding locations in the arrangement. Each holding location display includes a touch sensitive area defining a button that can be actuated by at least a first type of user engagement with the button. The food management system including a tangible storage medium having food management controller executable instructions stored therein. The instructions, when executed by the food management controller, display on each holding location display information associated with the status of the respective holding location. The tangible storage medium has food management controller executable instructions for executing a first operation in response to the first type of user engagement with the button when a first holding location status is displayed on the holding location display and for executing a second operation different than the first operation in response to the first type of user engagement with the button when a second holding location status is displayed on the holding location display.

Another aspect of the present invention is directed to a computer executable method for use with food holding apparatus having a plurality of holding locations. The method includes providing a user interface including a plurality of holding location displays associated with respective holding locations for displaying information associated with the holding locations. The holding location displays are arranged in an array corresponding to an arrangement of the respective holding locations. The holding location displays are positioned in the array corresponding to positions of the respective holding locations in the arrangement. Each holding location display including a touch sensitive area defining a button that can be actuated by at least a first type of user engagement with the button. The method also includes displaying on each holding location display information associated with the status of the respective holding location, executing, with a food management controller, a first operation in response to the first type of user engagement with the button when a first holding location status is displayed on the holding location display, and executing, with the food management controller, a second operation different than the first operation in response to the first type of user engagement with the button when a second holding location status is displayed on the holding location display.

Another aspect of the present invention is directed to a food management control system for managing food in a food holding apparatus having a plurality of holding locations. The food management control system includes a food management controller configured for monitoring status of the plurality of holding locations. The food management control system includes a user interface including a plurality of holding location displays associated with respective holding locations for displaying information associated with the holding locations. The holding location displays are arranged in an array corresponding to an arrangement of the respective holding locations and positioned in the array corresponding to positions of the respective first and second holding locations in the arrangement. Each holding location display includes a touch sensitive area defining a button that can be actuated by at least a first type of user engagement with the button and a second type of user engagement with the button different than the first type of user engagement with the button. The food management control system includes a tangible storage medium having food management controller executable instructions stored therein. The instructions, when executed by the food management controller, display on each holding location display information associated with the status of the respective holding location. The tangible storage medium has food management controller executable instructions for executing a first operation in response to the first type of user engagement with the button and for executing a second operation different than the first operation in response to the second type of user engagement with the button.

Yet another aspect of the present invention is directed to a computer executable method for use with a food holding apparatus having a plurality of holding locations. The method includes providing a user interface including a plurality of holding location displays associated with respective holding locations for displaying information associated with the holding locations. The holding location displays are arranged in an array corresponding to an arrangement of the respective holding locations and positioned in the array corresponding to positions of the respective first and second holding locations in the arrangement. Each holding location display includes a touch sensitive area defining a button that can be actuated by at least a first type of user engagement with the button and a second type of user engagement with the button different than the first type of user engagement with the button. The method further includes displaying on each holding location display information associated with the status of the respective holding location, executing, with a food management controller, a first operation in response to the first type of user engagement with the button, and executing, with the food management controller, a second operation different than the first operation in response to the second type of user engagement with the button.

Other objects and features will be in part apparent and in part pointed out hereinafter.

BRIEF DESCRIPTION OF THE DRAWINGS

FIGS. 14-16 is are schematic representations of a cook list of the present invention;

Corresponding reference characters indicate corresponding parts throughout the drawings.

DETAILED DESCRIPTION

Figure 1:
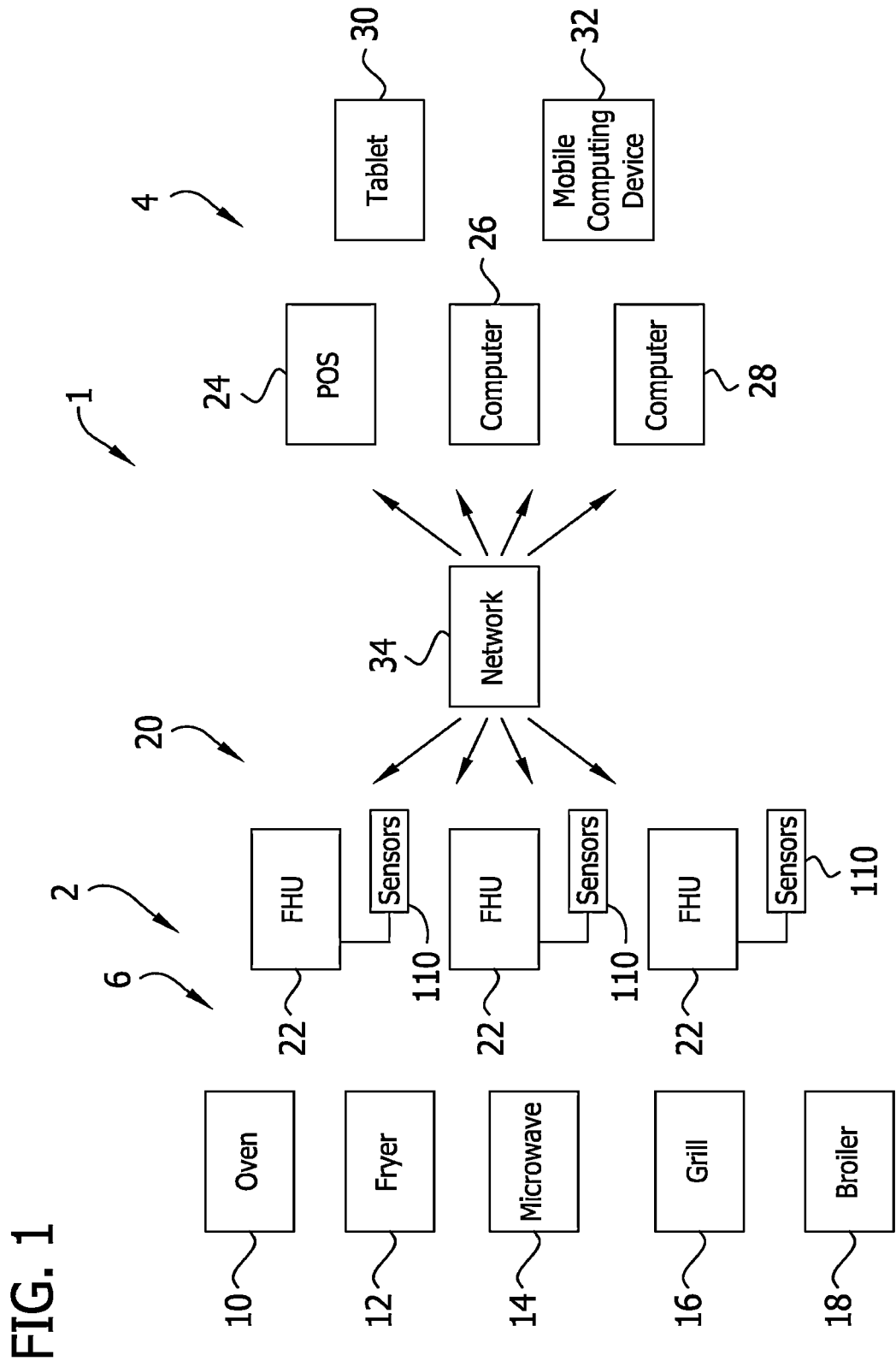
FIG. 1 is a schematic of a food management system of the present invention.

Referring to the drawings, FIG. 1 illustrates one embodiment of a food management system according to the present invention, indicated generally by the reference number 1. The system 1 may be used in various types of food preparation establishments, such as restaurants, including quick service or "fast food" restaurants. The system 1 can be used for forecasting or predicting food that will be ordered in the future, preparing food, monitoring food preparation and food inventory, providing indications and instructions regarding food preparation and food inventory, and so forth. The system 1 may include food preparation apparatus 2 and control apparatus 4. The food preparation apparatus 2 may include various food cooking devices 6 such as ovens 10, fryers 12, microwaves 14, grills 16, and broilers 18. The food preparation apparatus 2 may also include food holding apparatus 20 such as one or more food holding units 22 for holding cooked food in a condition suitable for serving. The control apparatus 4 may include various devices such as point-of-sale devices 24, local computers 26, remote computers 28, tablets 30, hand-held computing devices 32 (e.g., smart telephone), etc. The control apparatus 4 may be operatively connected with each other via a wired and/or wireless network 34 or other means. The control apparatus 4 may also be operatively connected with the food preparation apparatus 2 for sending and/or receiving signals therefrom. Aspects of food management systems are disclosed in U.S. Pat. Nos. 7,232,062 and 7,258,064, incorporated by reference above. It will be understood the food management system 1 of the present invention may include any of the aspects disclosed therein.

Figure 18:
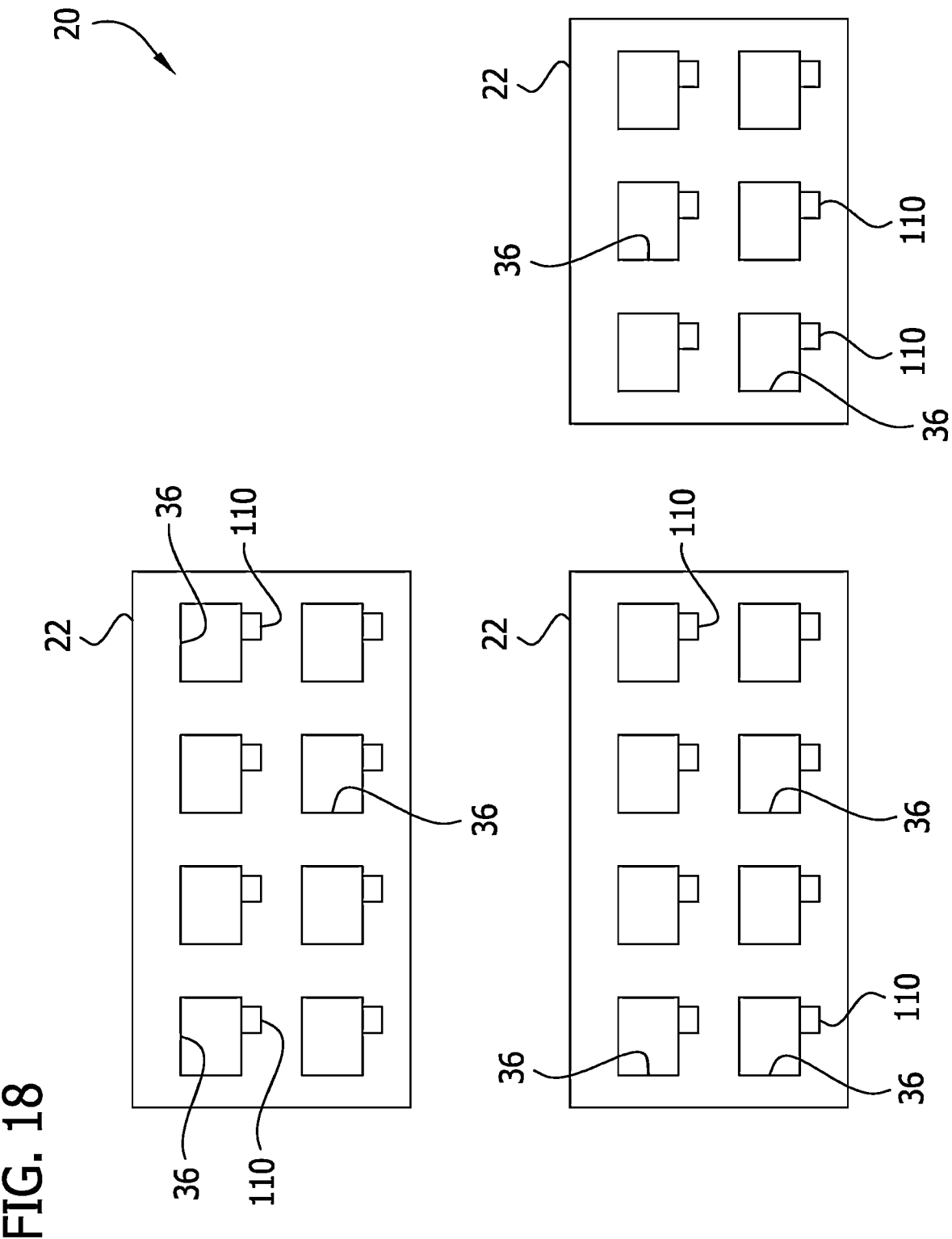
FIG. 18 is a schematic representation of a product holding apparatus of the present invention including multiple food holding units each having a plurality of food holding locations.

An aspect of the present invention relates to the food holding apparatus 20. In one example, as shown in FIG. 18, the food holding apparatus 20 may include one or more food holding units 22 adapted for holding food at a suitable temperature (e.g., cool temperature, ambient temperature, and/or warm temperature). Such food holding units 22 may include one or more locations 36 (e.g., compartments or wells) in which food may be received and held (e.g., in a container such as a pan). For example, the food holding units 22 may include holding locations 36 adapted for holding cooked food in a warm condition suitable for serving. Example of food holding units of this type are disclosed in U.S. Pat. Nos. 6,541,739, 7,105,779, and 7,328,654, all of which are hereby incorporated by reference in their entireties, and U.S. Pat. Nos. 7,232,062 and 7,258,064, incorporated by reference above. In another example, the holding apparatus 20 may include holding units 22 in the form of tables, countertops, shelves, cabinets, housings, refrigerators, freezers, other support structures or surfaces, or any combination thereof suitable for supporting food at holding locations. The holding locations may not include particular structure forming a compartment or well. For example, two holding locations may be adjacent portions of a generally flat support surface. The holding locations may be configured for holding the food in a warmed, refrigerated, ambient, or other environment. Depending on the needs of a particular quick service restaurant, one or more holding units 22 may be used. It will be understood that food held at holding locations of the food holding apparatus 20 may be held in a container, such as a pan, bag, box, or package, or may be placed uncontained or unpackaged at the holding location.

Figure 2:
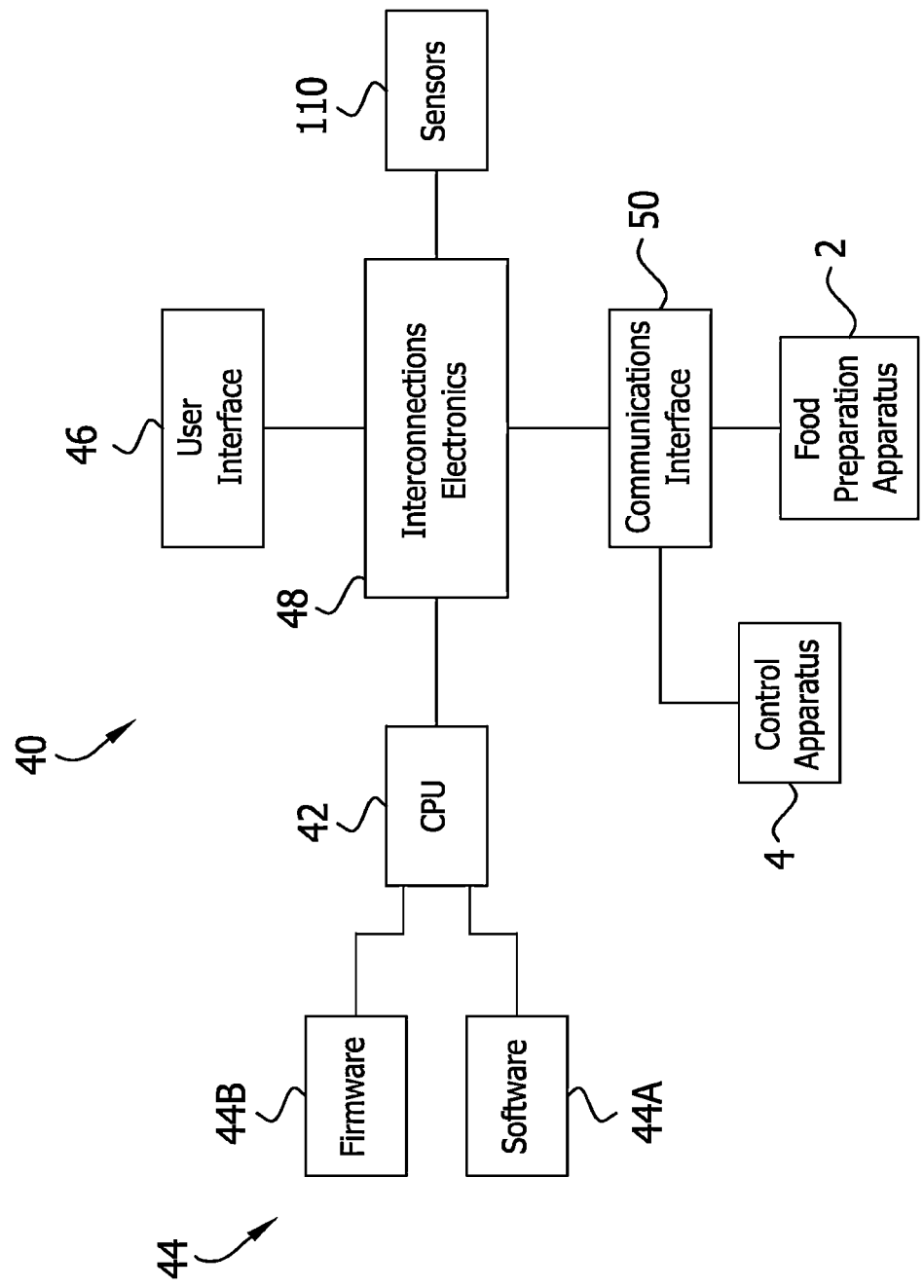
FIG. 2 is a schematic of a food management control system of the present invention.

A control system 40 (e.g., "food management control system" or "quick service food management control system") associated with the holding apparatus 20 is shown schematically in FIG. 2. Components of the control system 40 may be part of the holding apparatus 20 and/or other apparatus of the system 1, such as the point-of-sale device 24, local computer 26, remote computer 28, tablet 30, hand-held mobile computer 32, etc. The control system 40 includes a controller 42 (e.g., central processing unit or "CPU" or broadly "food management controller") including one or more processors, a tangible storage medium 44 (e.g., including forms of storage such as software 44A and firmware 44B), and a user interface 46. The tangible storage medium 44 may include at least one memory device, and information may be stored in the tangible storage medium (e.g., on at least one memory device) in one or more modifiable data structures. The controller 42 may be a microprocessor or the like. The control system 40 includes interconnection electronics 48 that operatively connect the various components of the control system 40 and may connect the control system via a communications interface 50 with other control apparatus 4 and/or food preparation apparatus 2. For example, the interconnection electronics 48 may include electrical or fiber optic lines or wireless communication devices. The communications interface 48 may include wired or wireless communications devices or connectors (e.g., USB flash drive port, other types of data ports, modems, wireless signal transmitters/receivers, etc.). The controller 42 is adapted for reading and executing processor executable instructions stored in the storage medium 44, and the controller is responsive to the user interface 46, for controlling the various components and systems of the control system 40. A user can enter or modify instructions stored on the storage medium 44 via the user interface 46 and/or via a communications interface 50. In the illustrated embodiment, the user interface 46 includes a touch screen display 64 (e.g., see FIG. 3), as explained in further detail below. The touch screen display 64 includes a screen for displaying various views to the employees and is sensitive to the touch of the employees for receiving input signals from the employees by user engagements with the touch screen (e.g., via finger "taps," "swipes," or "sustained presses"). Alternatively or in addition, the user interface 46 may include a display not sensitive to touch of a user. The user interface 46 may also include other input/output devices such as a keyboard and/or various types of audio/visual devices, such as a timer bar including buttons on the food holding apparatus. Other types of user interfaces may be used without departing from the present invention. The user interface 46 provides command signals via the interconnection electronics 48 to the controller 42. The command signals can include changes to the parameters (e.g., food preparation or inventory parameters, etc.) stored in the tangible storage medium 44. The controller 42 responds to the command signals and provides information (e.g., food status indications) and/or instructions via the interconnection electronics 48 to the user interface 46 to be communicated to the employees.

The at least one touch screen display 64 is associated with the food holding apparatus 20 for monitoring food preparation and inventory (e.g., uncooked and/or cooked food inventory) and providing associated information and instructions to employees. For example, the touch screen display 64 may be part of the point-of-sale device 24, local computer 26, remote computer 28, tablet 30, and/or handheld computing devices 32, etc. At least one touch screen display 64 is desirably positioned proximate the food holding apparatus 20 for reference by employees using the food holding apparatus. For example, in one embodiment, the touch screen display 64 is part of the tablet 30 and is mounted or otherwise supported next to the food holding apparatus 20. Alternatively, the touch screen display 64 may be part of the food holding apparatus 20. For example, the food holding unit 22 may include multiple touch screen displays (e.g., arranged in an array on the holding unit) associated with and positioned proximate to respective individual or groups of holding locations 36, or the food holding unit 22 may include a global touch screen display associated with all of the holding locations.

The user interface 46 (e.g., the touch screen display 64) may provide information to the employees and receive information from the employees regarding many aspects of food preparation and inventory, some of which will be understood by reference to the patents incorporated by reference herein. The touch screen display 64 may indicate to employees amounts and types of food to be cooked based on forecasted and/or recent orders. In addition, the touch screen display 64 may indicate to employees status of food being held in the food holding apparatus 20 (e.g., whether the food is suitable for being served, whether its hold time has expired, etc.).

Figure 3:
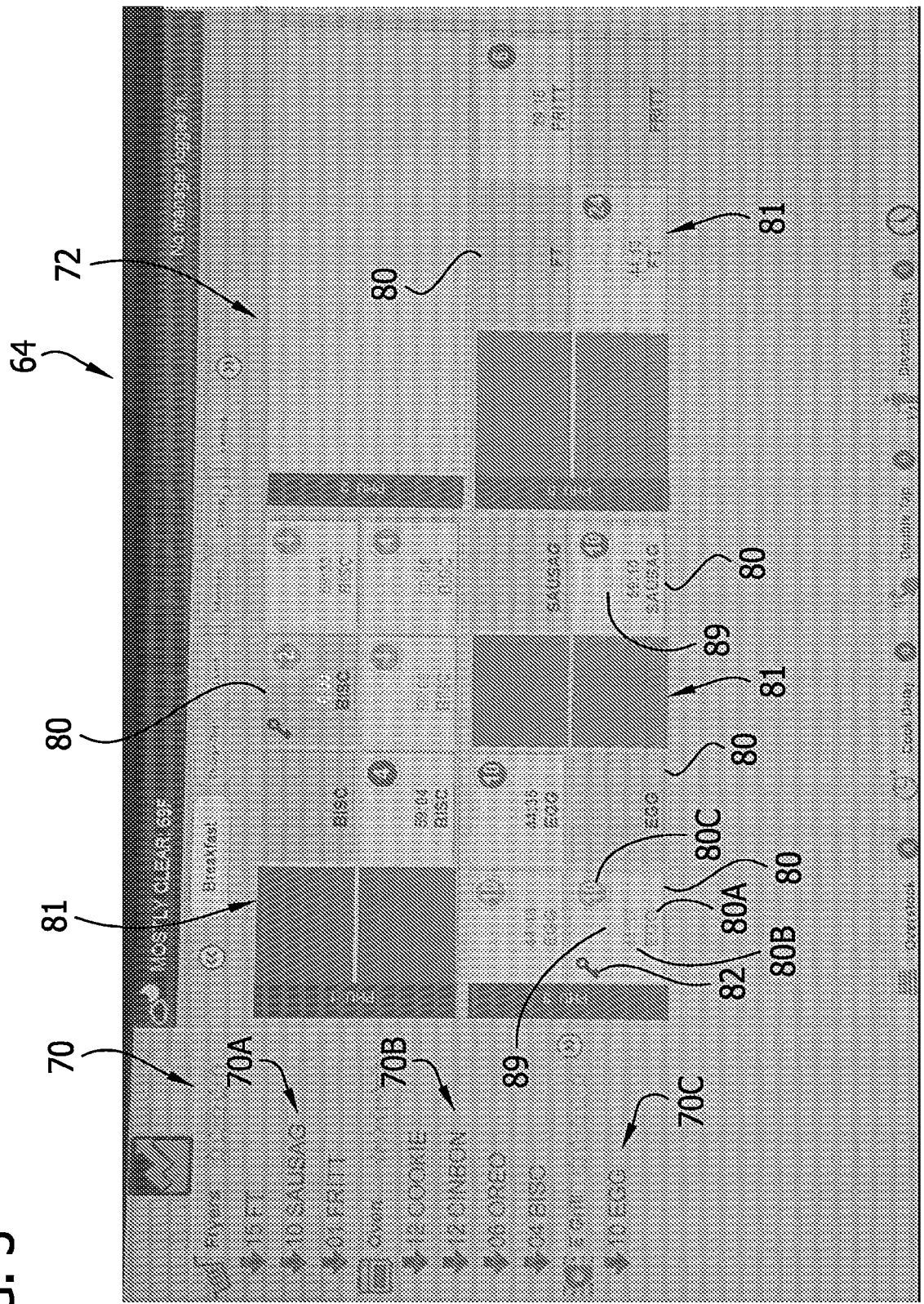
FIG. 3 is a photograph of a screenshot of a graphic interface of the present invention, the graphic interface displaying a cook list section on the left and a food holding apparatus status indication section on the right.

FIG. 3 shows a screen shot of an example view (graphic interface) that may be displayed on the touch screen display 64. The view includes on the left side a cook list section 70 indicating food to be cooked, and on the right side a food holding apparatus status indication section 72 showing status of the holding locations 36 of the holding apparatus 20 where food may be held. Regarding the cook list section 70, it will be understood that the control system 40 may forecast or predict food expected to be ordered in predetermined time increments (e.g., in time increments of 10, 15, 20, 30, 45, or 60 minutes), and the food needed to be cooked (demand) to meet upcoming time increments may be shown on the cook list section. Various calculations or algorithms may be used to predict the food needed to meet future orders. Examples of some forecasting calculations are disclosed in U.S. Pat. Nos. 7,232,062 and 7,953,632. The forecasting may be based on historical data (e.g., sales in dollars and/or food amounts) generated by the point-of-sale device 24, recent trends in sales or demand for food types (e.g., as determined by signals from the point-of-sale device, such as recent customer orders), and other parameters or special factors (e.g., weather, local sporting events). In the illustrated embodiment, the cook list section 70 includes a plurality of cook lists 70A, 70B, 70C corresponding to different cooking devices including the fryers 12, ovens 10, and grills 16. It will be understood that other types of food preparation apparatus (such as the broiler 18, microwave 14, etc.) may be shown based on the apparatus needed for preparing food at the relevant time of the day. Moreover, one cook list may include food types to be cooked by different cooking devices without departing from the scope of the present invention. The food types to be cooked are indicated by a food type indicator such as a full or abbreviated name of the type of food (e.g., "BISC" for biscuits, "FT" for French toast, "EGG" for eggs, and so forth) and an amount of that food type to be cooked (e.g., "15" for "FT," "10" for "SAUSAG"), which together may be referred to as a line item. The food type indicator may include an symbol (e.g., graphic) in place of or in addition to the alpha/numeric text for the food type indicator and/or amount to be cooked. The cook lists are stored on the tangible storage medium 44 (e.g., in a data structure therein) and are modifiable by the controller 42, as will become apparent. Additional aspects of the food cook list section 70 will be described in further detail below.

Food may be stored in the food holding apparatus 20 (e.g., after it is cooked or otherwise prepared, such as by thawing, cutting, assembling, and/or portioning) until it is served to a customer or discarded as waste. Inventory of food held in the food holding apparatus 20 may be monitored by the control system 40, and indications of the status of the holding locations 36 (e.g., status of food held at the holding locations) may be shown on the touch screen display 64. As will be explained in further detail, the food holding apparatus status section 72 indicates status of food holding locations 36 such as "no food present," "food present," "food suitable for serving," "food to be served first," "food to be served second," and "food expired or to be discarded."

Figure 4:
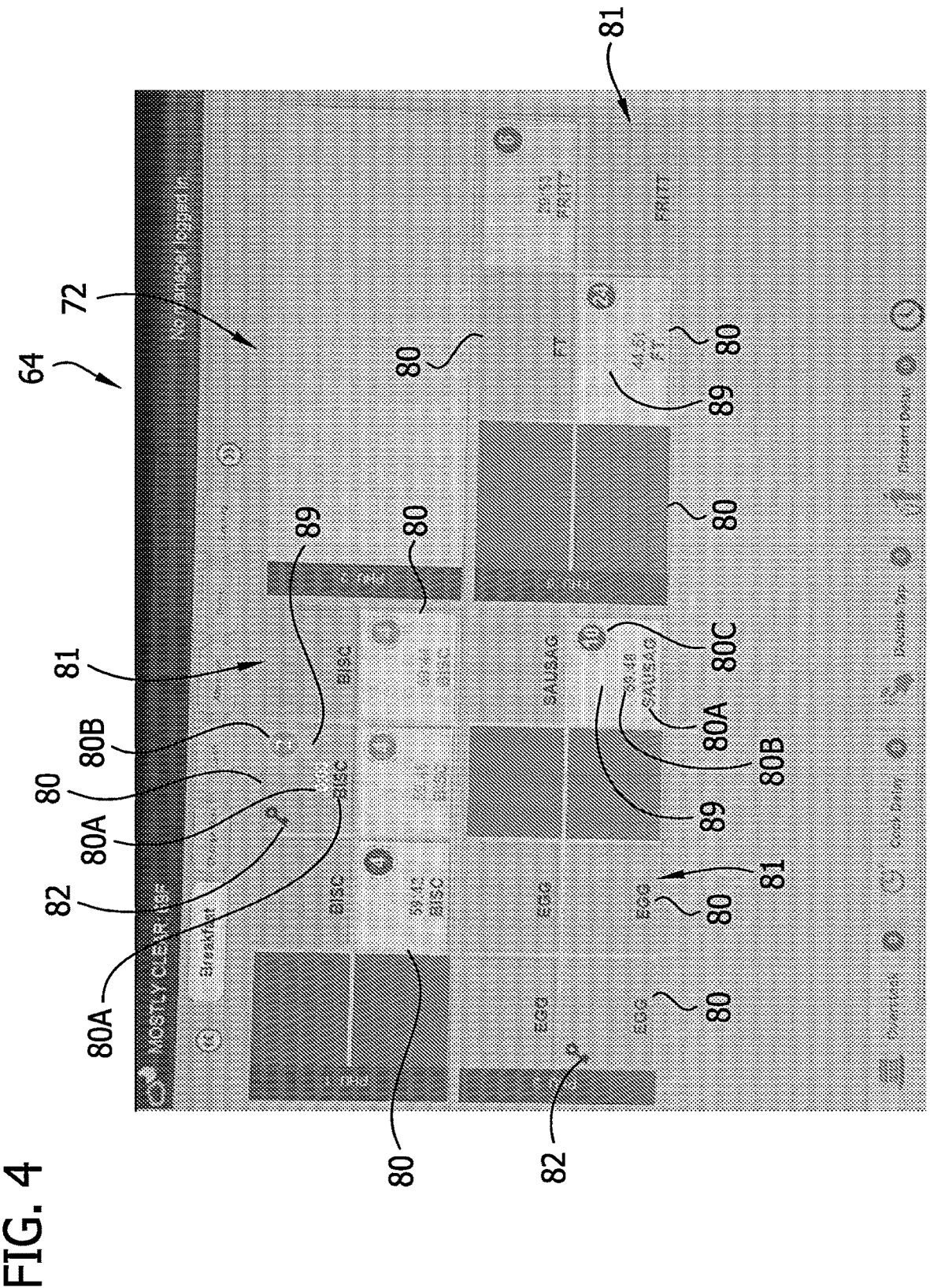
FIGS. 4-13 are photographs of screenshots of the user interface including the food holding apparatus status indication section.

Referring to FIG. 4, in which a partial view of the touch screen display 64 is shown without the cook list section 70, the food holding apparatus status section 72 includes an array of holding location displays 80 representing respective holding locations 36 of the food holding apparatus 20 and on which information associated with the respective holding locations is displayed. The holding location displays 80 are arranged in an array (e.g., including columns and rows) corresponding to an arrangement of the food holding locations 36, and the holding location displays are positioned in the array corresponding to the position of the respective holding locations in the arrangement. The array of compartment displays 80 includes sub-arrays 81 of holding location displays representative of holding locations 36 of individual food holding units 22 (e.g., "PHU 1," "PHU 2," "PHU 3"). The status of the respective locations 36 may be shown by status indicators such as symbols, color, outlining, bolding, flashing, text, numbers, graphics or other visual indicators. In the illustrated embodiment, the locations 36 that are inactive are indicated by a generally blank holding location display 80 and dim or gray appearance of the holding location display. The holding locations 36 that are active are indicated at least by a food type indicator 80A (e.g., food type name or symbol, etc. representing the food type) indicating the food type to be held at the holding location. Among the active holding locations 36, those in which no food is held are indicated by there not being a countdown timer 80B displayed and optionally a relatively dim appearance or blue shading of the holding location display 80. The holding locations 36 in which food is held are indicated by a lighter (e.g., illuminated/white) appearance, a displayed hold time indicator 80B (e.g., countdown timer), and a food amount indicator 80C (e.g., a number representative of the amount of food held at the location 36). A holding location 36 having food for which the hold time has not yet elapsed and which has been held the longest (or will expire the soonest) among locations holding the same type of food is indicated by green coloring. For example, the hold time indicator 80B, food type indicator 80A, and food amount indicator 80C may be displayed in green. Alternatively, the holding location display 80 may include a green background. Holding locations 36 having the same food type that have been held for a shorter time are indicated by yellow coloring (or orange/amber coloring). For example, the hold time indicator 80B, food type indicator 80A, and food amount indicator 80C may be displayed in yellow. Alternatively, the holding location display may include a yellow background. It will be understood that these indicators convey to the employees to serve food from the location 36 indicated by green (corresponding to food longest held or soonest to expire) before serving food from the location indicated by yellow to facilitate a "first-in, first-out" serving convention. A holding location 36 having food for which the hold time has elapsed is indicated by red coloring. For example, the hold time indicator 80B (e.g., "0:00"), food type indicator 80A, and food amount indicator 80C may be displayed in red. Alternatively, the holding location display 80 may include a red background (e.g., flashing red background). The processor 42 is responsive to instructions in the tangible storage medium 44 and user input from the user interface 46 for displaying, updating, and changing the indicators on the holding location displays 80.

Although the holding location displays 80 are illustrated as all being sections of the touch screen display 64, it will be appreciated that other configurations can be used without departing from the scope of the present invention. For example, the holding location displays 80 could be unconnected or separate from each other (e.g., on respective separate touch screen displays). Such separate holding location displays could still be arranged in an array corresponding to the holding locations. For example, the holding location displays 80 could be positioned on the holding apparatus 20 in such an array (e.g., next to the respective holding locations 36).

Although the illustrated hold time indicators 80B are count down timers, it will be understood other hold time indicators may be used without departing from the scope of the present invention. For example, the hold time indicator may be a count up timer, a static time (e.g., static expiration time), color, symbol, graphic, text, bolding, highlighting, outlining, or other indicator without departing from the scope of the present invention. As used herein, the term "hold time" can mean an expiration time, a time remaining until expiration, a time food has been held, etc., without departing from the scope of the present invention.

Although the illustrated food amount indicators 80C indicate numbers of food items, it will be understood other types of food amount indicators may be used without departing from the scope of the present invention. For example, it may be desirable to indicate amount of food by weight, volume, percentage (e.g., percentage of an amount), or other measures, any of which may be used without departing from the scope of the present invention.

In one aspect of the present invention, employees may be trained to serve food from designated "primary" or "serving" locations 36 of the holding apparatus 20. It may be desirable to train the employees to serve from these designated primary locations 36 for ease of use and efficiency. For example, when the primary holding location is not holding food, employees should transfer non-expired food of that type held in other locations 36 to the primary location for that food type, or place new food at the primary location instead of a different location for that food type. The primary locations 36 may be indicated by primary location indicators 82 on the respective holding location displays for distinguishing the primary locations from other locations designated for holding the same type of food. In the illustrated embodiment, primary locations 36 are indicated by "key" symbols 82 in the upper left corner of the holding location displays 80 representative of the primary locations. The primary holding location indicators 82 are particularly helpful to a user in distinguishing the primary holding location from another holding location when both holding locations are indicated on the respective holding location displays as being active but not holding food. For example, referring to FIG. 4, the two lower "EGG" holding locations are both shown by their holding location displays 80 as being active but not holding food. The holding location displays for those two holding locations have essentially the same appearance except for the primary holding location indicator 82 distinguishing one from the other. To assist a user in placing food at the primary holding location, if the user attempts to enter food at a non-primary holding location (e.g., via user input), and the primary location is not holding food, the controller 42 may prompt the user (e.g., with an appropriate alert or prompt window) to enter the food into the primary holding location instead of the non-primary holding location. The primary locations 36 may be indicated in other ways, such as by other symbols (e.g., stars, asterisks, etc.), graphics, text, color, outlining, bolding, highlighting, etc. without departing from the scope of the present invention. For example, the primary locations 36 may be lower, left locations relative to the other locations (e.g., at a bottom left side of the array of holding location displays) for holding the same type of food (e.g., see the EGG location displays 80 in FIG. 4), or may be a top, center location relative to the other locations (e.g., see the BISC location displays 80 in FIG. 4). The primary location 36 may be pre-determined and stored in the tangible storage medium 44 (e.g., in a data structure stored by the tangible storage medium). The primary locations 36 may be programmed and re-programmed (e.g., using the user interface 46) according to preference and convenience. The primary locations will be discussed in further detail below with respect to transfer of food among holding locations.

Various aspects and functions of the control system 40 and in particular the user interface 46 (e.g., touch screen display 64) will now be explained with reference to FIGS. 4-12. In an aspect of the present invention, various operations of the control system 40 may be initiated or executed by different user engagements with the touch screen display 64, and in particular with buttons 89 of the holding location displays 80. For example, an employee may perform different engagements by "quickly tapping" (e.g., briefly touching for 0.5 seconds or less and releasing) or "long holding" (i.e., "sustained pressing," e.g., for 1 or 1.5 seconds) on the touch screen 64, as will be described in further detail below. As used herein, a "sustained press" is defined as being a substantially longer engagement than a "tap," such as at least about 0.5 seconds, at least about 1 second, at least about 1.5 seconds, etc. longer than a tap. Other types of single user engagements may be used, such as "sustained pressing and dragging," and multiple user engagements can be used, such as multiple "taps," multiple "sustained presses," and any combination of such user engagements, without departing from the scope of the present invention. The tangible storage medium 44 may include processor executable instructions for changing the result brought about by or the operation executed as a result of the different types of engagements of the touch screen display 64 as a function of the status of the particular holding location 36 indicated by the holding location display 80 engaged by the employee. It will be appreciated that the multiple functionality of the holding location display buttons 89, and the changing functionality of the buttons as a function of the status of the holding locations 36 (as indicated by the holding location displays 80), may enable the food holding apparatus status section 72 to have a relatively clean appearance and be relatively uncluttered, which enhances user understanding and facilitates efficient interaction.

In the illustrated embodiment, the food holding apparatus status section 72 includes the plurality of holding location displays 80, which each include a touch sensitive area defining the button 89. In the illustrated embodiment, the buttons 89 are substantially co-extensive with the holding location displays 80 and have respective boundaries adjacent boundaries of the holding location displays. In the illustrated embodiment, the boundaries of the buttons 89 are shown as rectangular outlines or borders that are also the boundaries of the respective holding location displays 80. The buttons 89 may have other sizes and shapes without departing from the scope of the present invention. For example, the buttons may be at least 40%, at least 50%, at least 60%, at least 70%, at least 80%, at least 90% or more of the holding location displays. The buttons 89 desirably have sufficient size to facilitate convenient engagement with them by a finger of a user. It will be appreciated that the holding location displays 80 may be relatively small, and it may be desirable to provide the buttons 89 with the largest size possible to facilitate engagement with the buttons. In the illustrated embodiment, the buttons 89 are the only buttons in the touch sensitive area of respective holding location displays 80. The size of the buttons 89 may be described with reference to the holding location indicators that are displayed on the holding location display 80 in the touch sensitive area defining the buttons. For example, one or more indicators such as the food amount indicator 80C, food hold time indicator 80B, and food type indicator 80A can be displayed in the touch sensitive area of the holding location display 80 defining the button 89. In the illustrated embodiment, when the holding location display indicates no food is held and when it indicates food is held and not yet expired, only information representative of the status of the holding location is displayed in the touch sensitive area of the holding location display 80 defining the button 89. When a holding location display indicates a status of no food held or food held is not yet expired, the touch sensitive area of the holding location display is free of any indicator indicating an operation executed in response to engagement with the button. It is believed the above features provide the holding location displays with a relatively clean appearance and facilitate quick user comprehension and interaction. Other button configurations may be used without departing from the scope of the present invention. As will be described in further detail below, the buttons 89 may be actuated by different types of user engagement with the buttons, such as the user engagements described above. For example, a button 89 may be actuated by briefly tapping the button to bring up a prompt window providing access to various other buttons associated with the holding location 36 or by making a sustained press of the button to execute certain functions with or without bringing up a prompt window. It will be understood that the operations initiated or executed by the different types of user engagement with the buttons 89 associated with the holding locations 36 (e.g., brief tap and sustained press) may be other than described or be switched without departing from the scope of the present invention.

Figure 5:
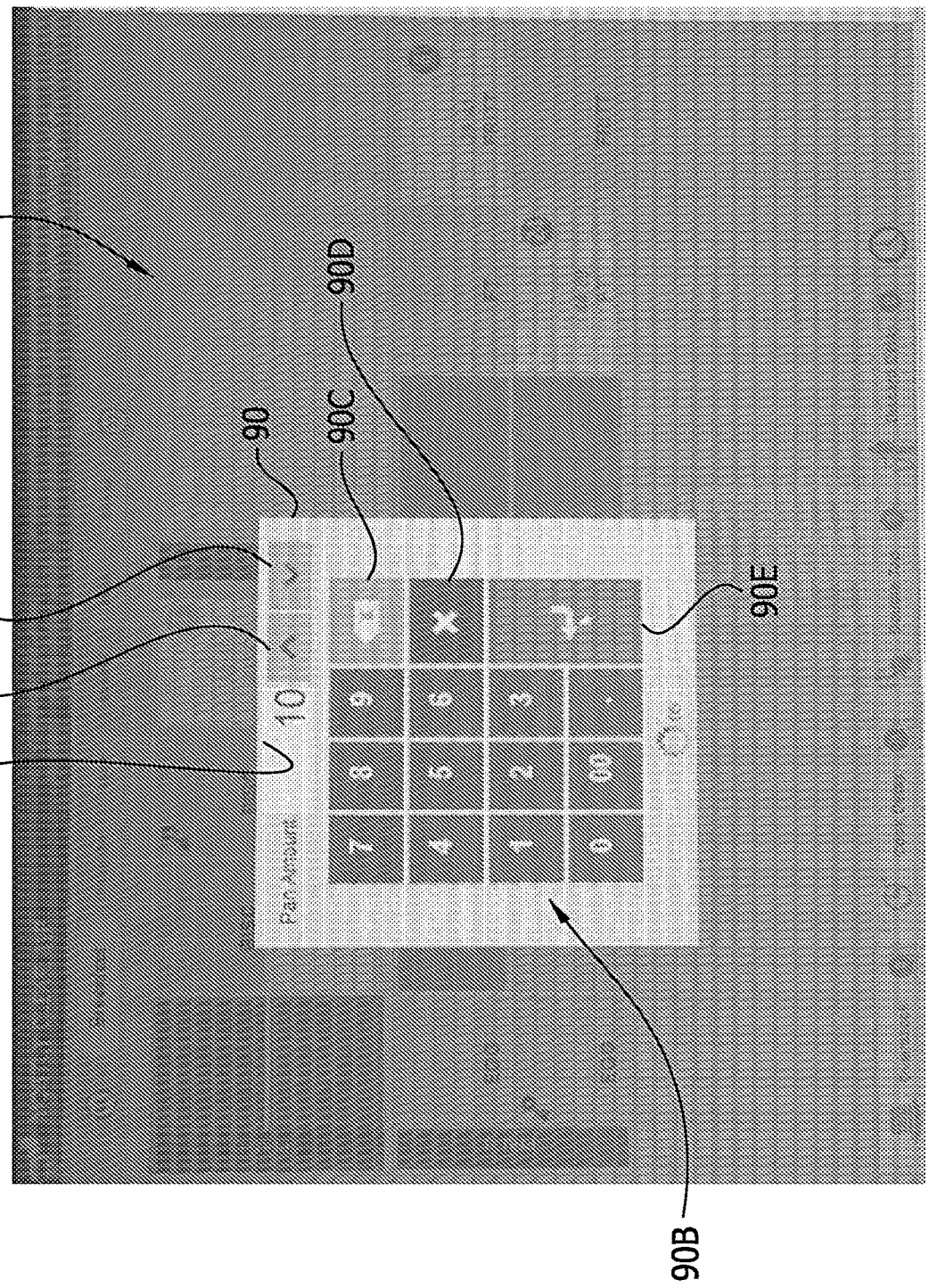
Figure 6:
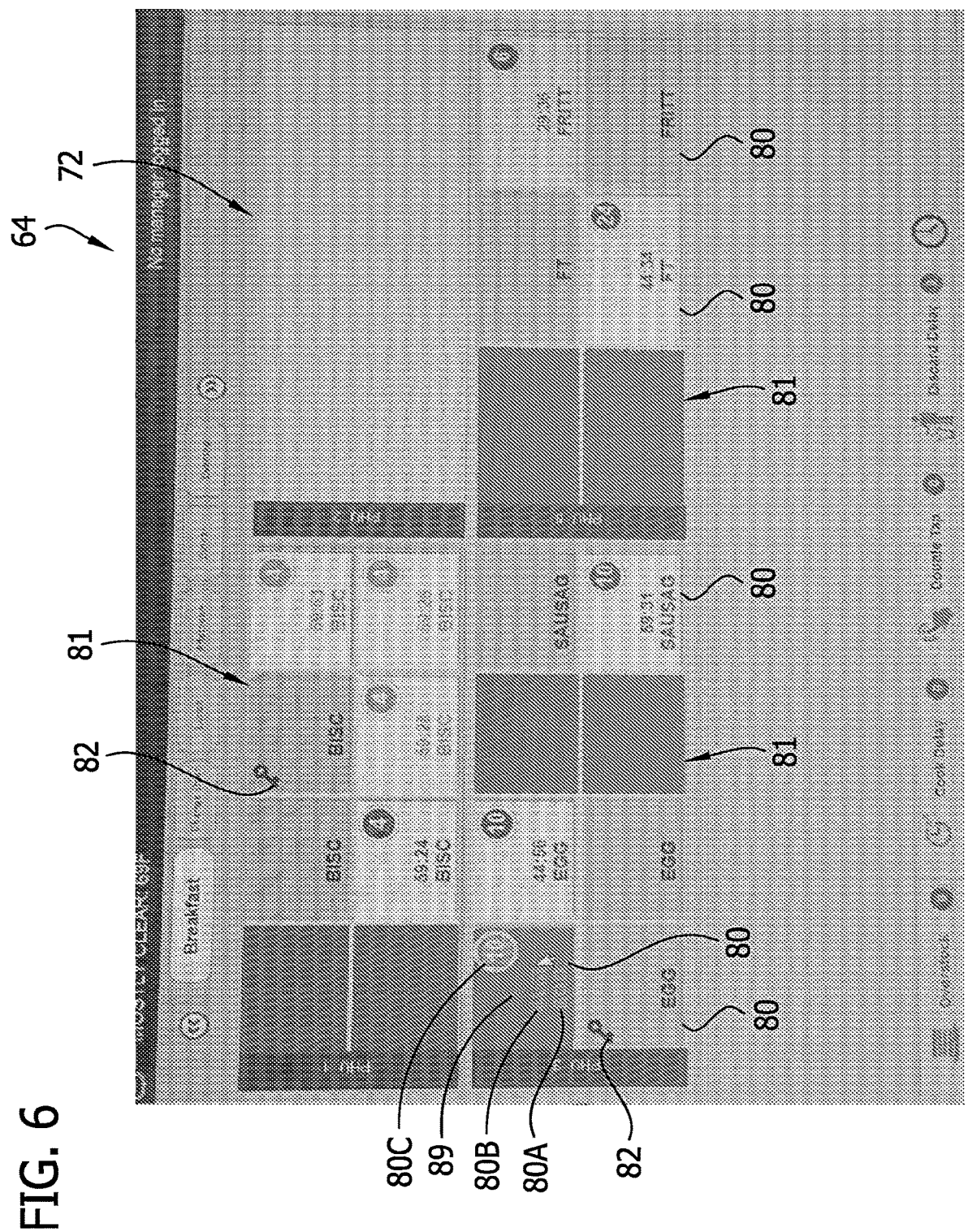

When food is ready to be held in the food holding apparatus 20 (e.g., after the food has been cooked), an employee may place the food at a chosen location 36 of the food holding apparatus appropriate for holding the particular type of food. Desirably, the chosen location 36 is indicated on its holding location display 80 as being active but not holding food. For example, as shown in FIG. 4, if the employee cooked eggs, the employee may place them in the top right EGG location 36. To signal to the control system 40 that the eggs are now present in that location 36, the employee may briefly "tap" or "long hold" ("sustained press") the holding location display 80 representing that location on the touch screen display 64. If the employee "taps" the holding location display 80, the prompt window 90 shown in FIG. 5 appears. The prompt window 90 includes an input value field 90A, number buttons 90B, a back or delete button 90C, a discard or waste button 90D, and an enter or return button 90E. The input value field 90A may be automatically filled with the amount of that type of food the control system expects that the employee cooked. In other words, the amount of eggs that the cook list 70C instructed the employee to cook (in this case 10) may be automatically provided by the controller 42 in the input value field 90A as a default or suggested amount of food to be entered. If the employee would like to deviate from the suggested amount of food (e.g., if a different amount was cooked), they may change the amount in the input value field 90A using the delete button 90C and number buttons 90B. The employee may press the enter button 90E to signal to the control system 40 that the amount shown in the input value field 90A is the amount of food supplied to the relevant holding location 36. The controller 42 logs this amount in the tangible storage medium 44 as being the amount of food held at the associated holding location 36. The prompt window 90 then closes, and the food amount indicator 80C and hold time indicator 80B appear on the holding location display 80 representative of that location 36. If the employee does not press the enter button 90E, the prompt window 90 will disappear after a predetermined relatively short time (e.g., 2, 3, 4, etc. seconds), and the food amount shown in the input value field 90 will be entered and appear in the food amount indicator 80C on the holding location display 80, such as shown in FIG. 6. Alternatively, if the employee would like to bypass the prompt window 90, the employee may "long hold" the holding location display 80 associated with the holding location 36, which will cause the suggested or default amount of food to be entered (e.g., without any further user input from the employee). The controller 42 logs this amount in the tangible storage medium 44 as being the amount of food held at the associated holding location 36. The prompt window 90 will not be shown, the default food amount will be represented by the food amount indicator 80C, and the countdown timer 80B will appear and begin to count down.

While a holding location 36 is indicated on its respective holding location display 80 as containing food, the amount of food indicated as being held at the holding location may be updated. For example, if the holding location 36 is indicated as "serve first" (e.g., green color), the control system 40 will presume the employees are serving food from that location, and the controller 42 will change (e.g., update) the food amount indicator 80C of the holding location display 80 representing that "serve first" holding location 36 to represent a decreased amount of food, responsive to a signal from the point-of-sale device 24 indicating an amount of food of that type has been ordered by a customer. The controller 42 logs this decreased amount in the tangible storage medium 44 as being the amount of food held at the associated holding location 36. For example, if the food amount indicator 80C shows "10" and the point-of-sale device 24 signals a customer ordered one item of that food type, the controller 42 will display on the respective holding location display 80 an updated food amount indicator to show "9." This may occur substantially in real-time, in a delayed fashion, and/or periodically. Moreover, for various reasons, the employees may need to update the amount of food indicated as being held. For example, some of the food may have fallen out of the pan while the employee was taking food from the pan. To manually increase or decrease the amount of food indicated by the food amount indicator 80C, the employee may briefly "tap" the holding location display 80 associated with the relevant location 36 to bring up the prompt screen 90 shown in FIG. 5. The employee may enter the correct amount of food in the input value field 90A such as by using the delete button 90C and/or the number buttons 90B and update the food amount indicator 80C with that amount using the enter button 90E. The controller 42 logs this amount in the tangible storage medium 44 as being the amount of food held at the associated holding location 36.

While a food holding location 36 is indicated on the associated holding location display 80 as containing food suitable for serving, the food may be transferred from that holding location to a different holding location, and the hold time indicator 80B may be transferred to the holding location display 80 associated with the different holding location. For ease of reference, the holding location 36 from which the food is transferred will be referred to as the origin holding location, and the location to which the food is to be transferred will be referred to as the destination holding location. For example, as explained above, it may be desirable for employees to serve food from a primary or serving location of the holding apparatus 20 for a particular type of food. If the primary holding location needs to be supplied with food, food from another holding location 36 (e.g., a container having an amount of food in it) may be transferred to the primary location. The identity of the primary holding location may be stored in the tangible storage medium 44 as a default destination holding location. In other words, transfers to the primary holding location may be executed automatically as "default transfers." In such cases, the primary holding location indicator 82 can be referred to as a default destination location indicator. Alternatively or in addition, the control system 40 may permit "selected transfers" (e.g., override of "default transfers") in which the employee selects a desired destination holding location that is different than the default destination holding location. For example, processor executable override instructions responsive to user input would designate a different holding location 36 than the default location as the destination holding location. In one example, the instructions to identify the destination holding location would identify the default holding location as the only destination holding location unless the override instructions have been executed prior to execution of the identifying instructions.

Figure 7:
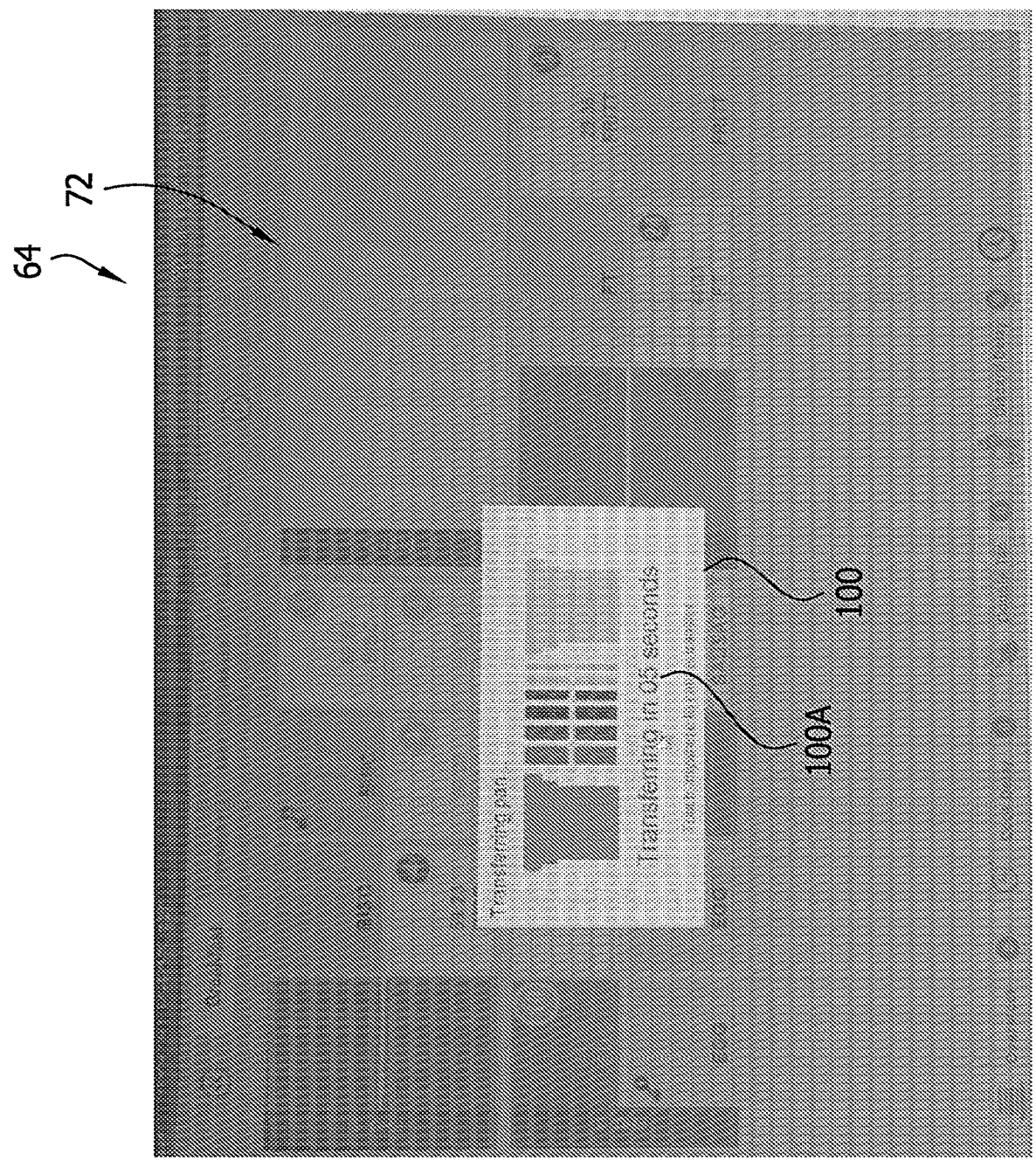
Figure 8:
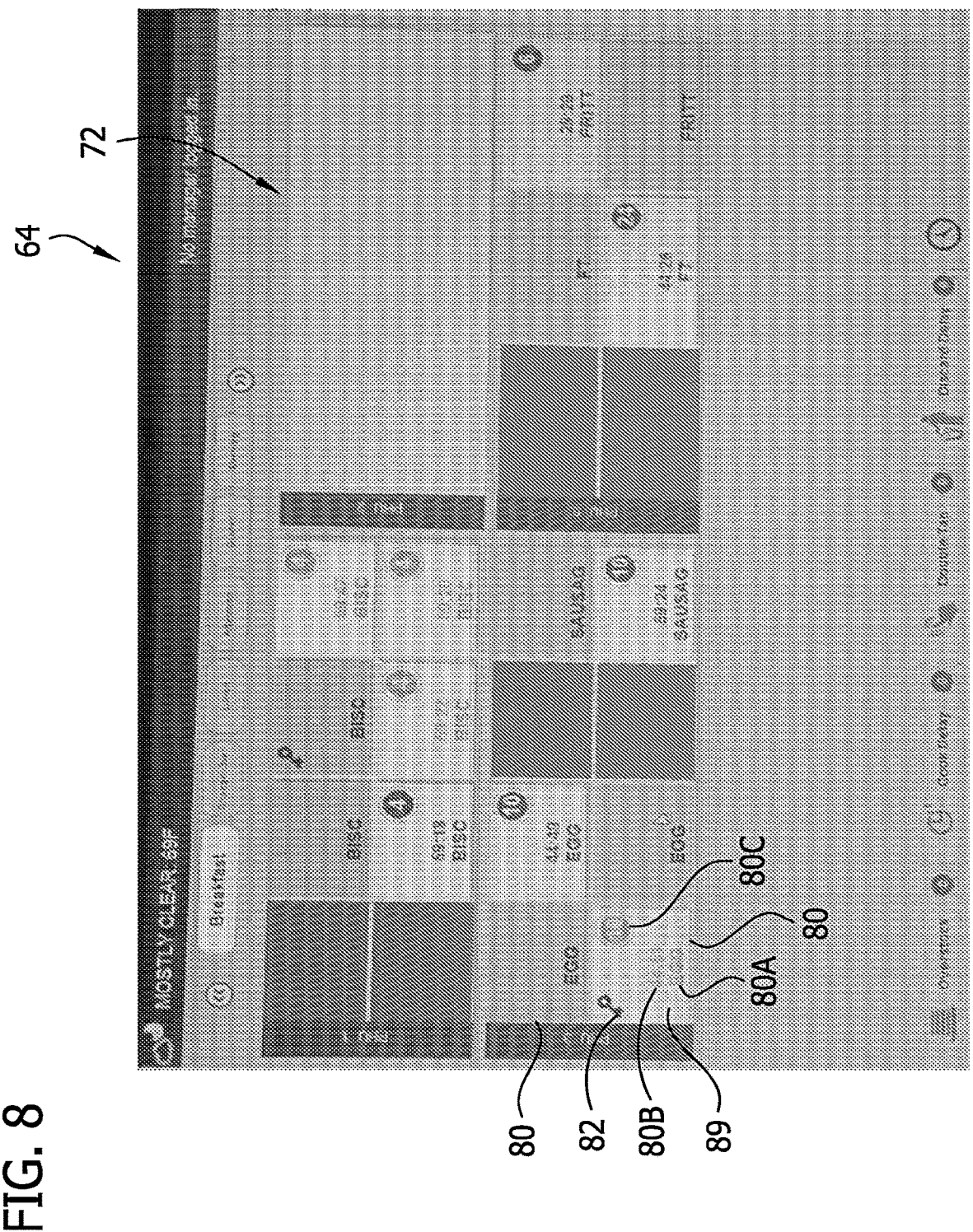
Figure 9:
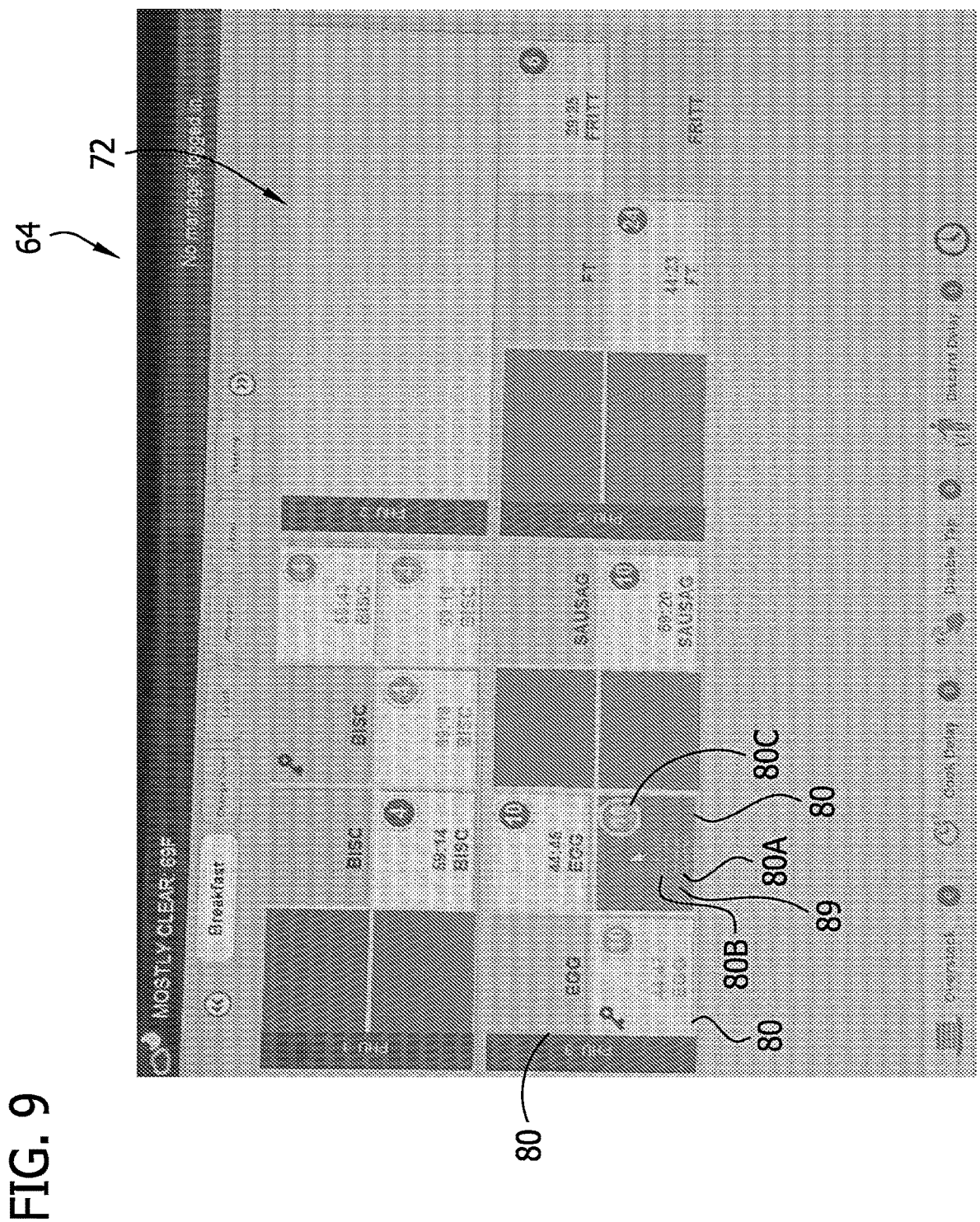

Transfers may be executed in various ways, such as by different types of user engagement with the buttons 89 of the holding location displays 80. For example, the transfer function may be executed by "long holding" ("sustained pressing") the button 89 on the holding location display 80 for an origin holding location. Referring to FIG. 6, the top left EGG holding location 36 is indicated as being long held by the gray shading of the holding location display 80. The long hold may bring up a pending transfer window 100, such as shown in FIG. 7. The pending transfer window 100 may be shown for a relatively short pending transfer time (e.g., 2, 3, 4, 5, etc. seconds), during which time a pending transfer countdown timer 100A may be shown in the transfer window, and during which time the employee may cancel the transfer (e.g., by tapping the touch screen display 64 outside the transfer window 100). At the end of the pending transfer time, the transfer window 100 disappears, and the food amount indicator 80C and hold time indicator 80B are transferred from the origin holding location display 80 to the primary (destination) holding location display. The controller 42 transfers association of the hold time to the destination holding location and records this in the tangible storage medium 44. In other words, in response to the long hold, the control system 40 executes an "automatic transfer" to the default (primary) destination holding location display 80 (e.g., without any additional user input). For example, as shown in FIG. 8, the food amount indicator 80C and hold time indicator 80B have been transferred from the top left EGG holding location display 80 to the primary, bottom left EGG holding location display 80. The pending transfer window 100 may be omitted without departing from the scope of the present invention. In other words, a transfer may happen without the intermediate step of displaying the transfer window 100.

Figure 10:
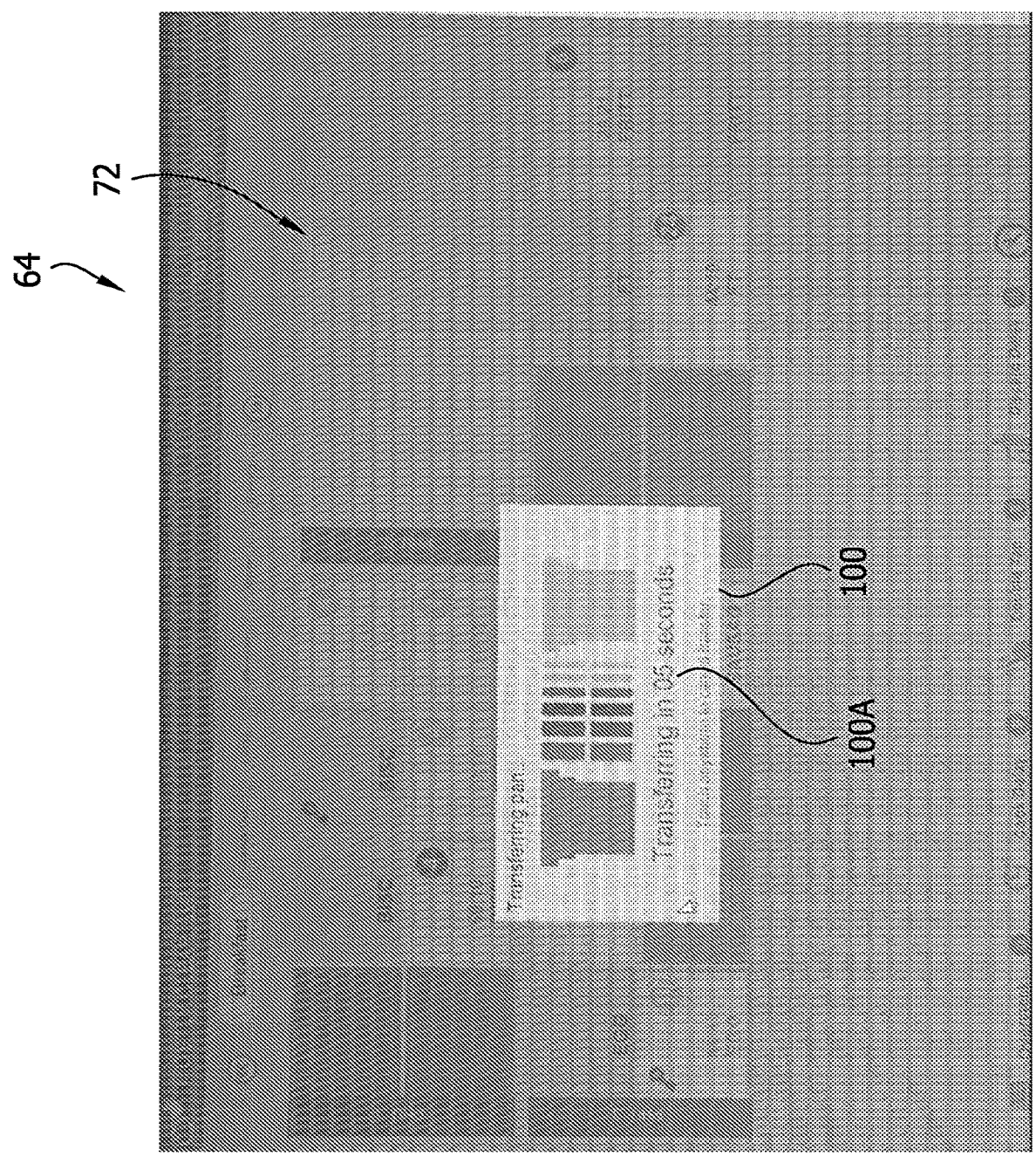
Figure 11:
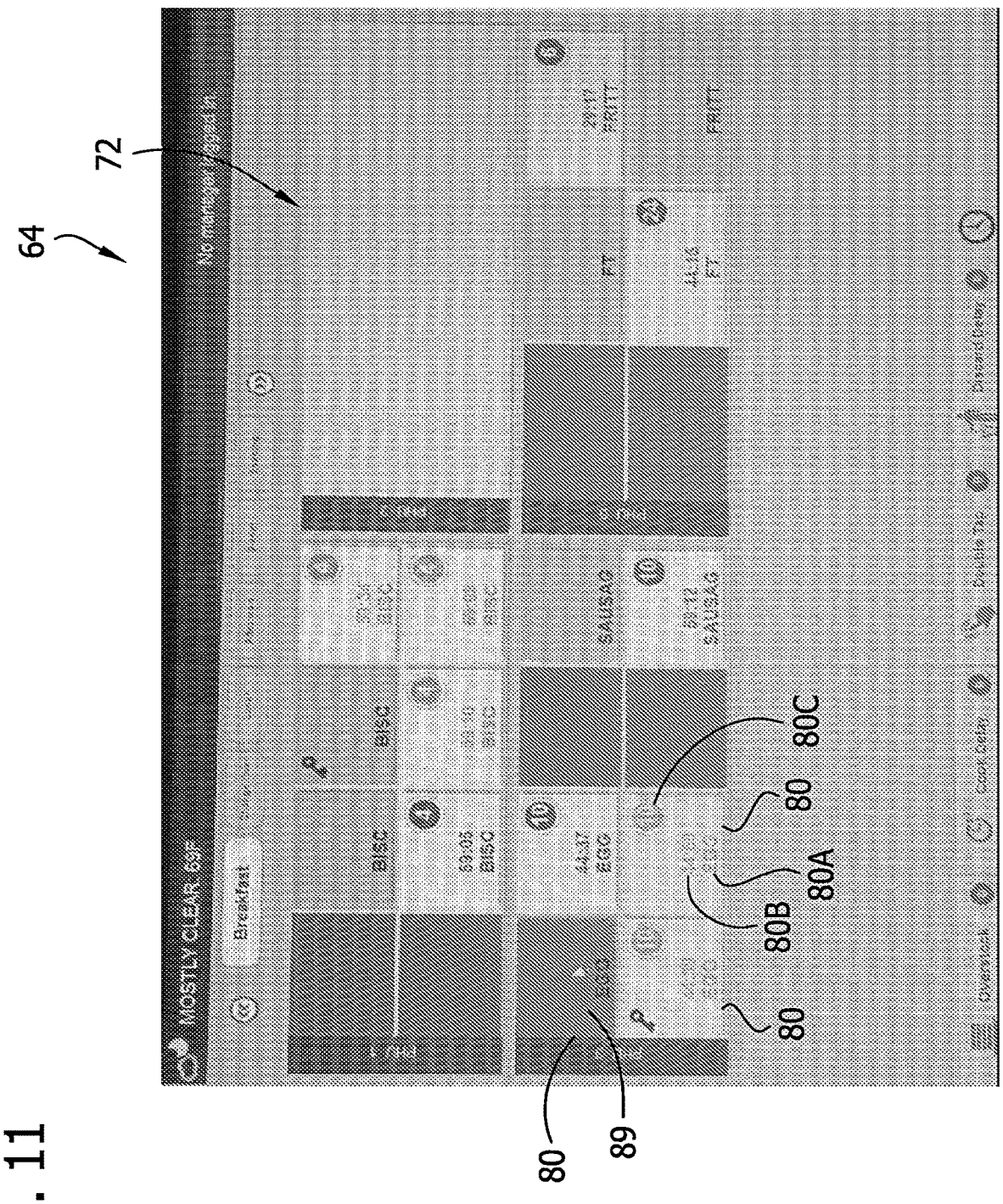
Figure 12:
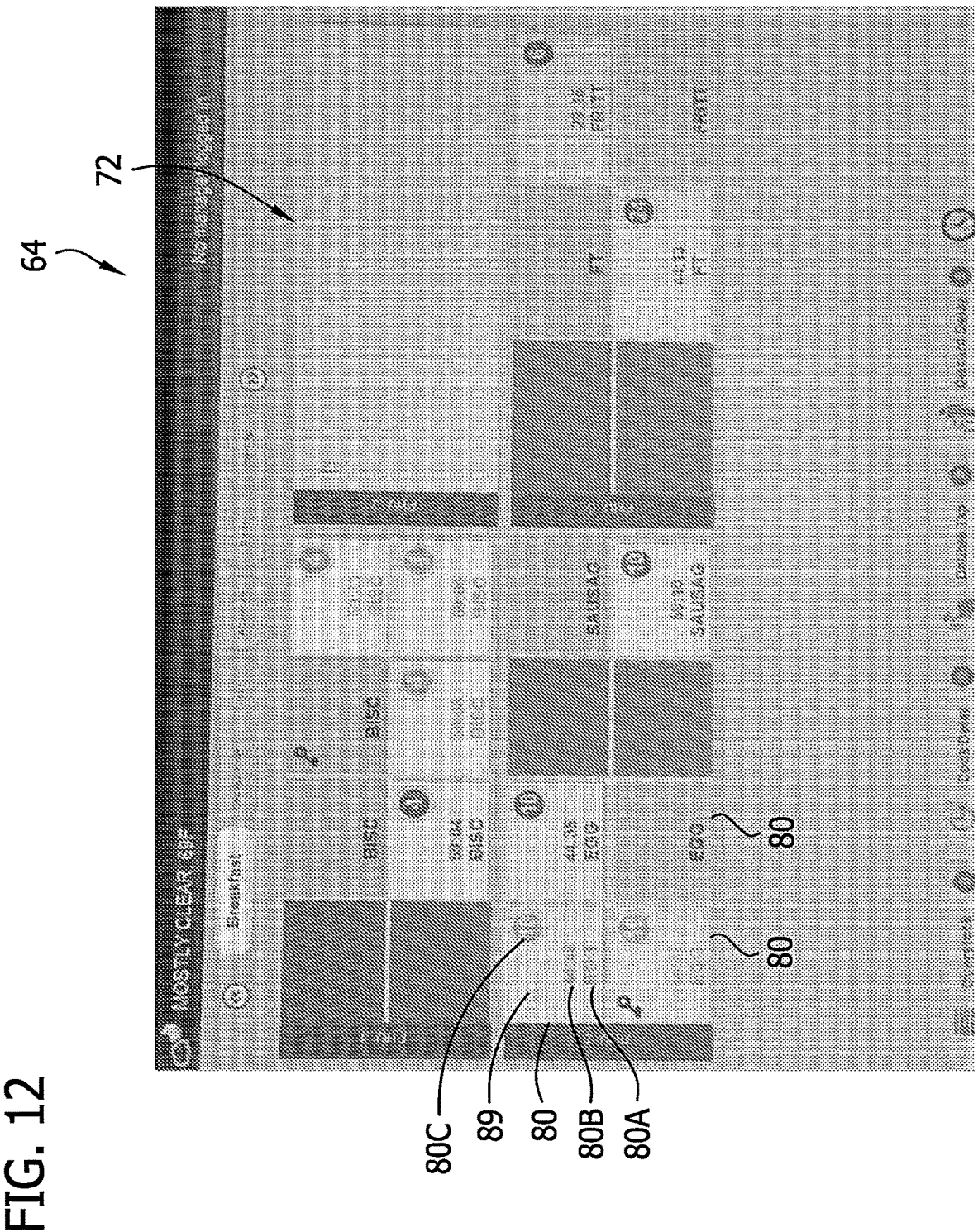

Alternatively, if the employee desired to make a "selected transfer," they could, for example, during the pending transfer countdown time, tap the pending transfer window 100 to signal the control system 40 to execute a selected transfer instead of a default transfer. An example of such a process is illustrated in FIGS. 9-12. The bottom right EGG holding location display 80 is illustrated as being long held by gray shading in FIG. 9. This brings up the pending transfer window 100, as shown in FIG. 10. Tapping the pending transfer window 100 makes the window disappear, after which the employee may tap the holding location display 80 representative of the desired or selected destination holding location. FIG. 11 illustrates the employee tapping the top left EGG holding location display 80 (e.g., indicated by the gray shading). In response to this user input, the controller 42 executes the selected transfer or default transfer override instructions in the tangible storage medium 44. The processor 42 transfers the food amount indicator 80C and hold time indicator 80B of the origin holding location display 80 (the bottom right EGG location 36) to the holding location display 80 of the selected destination holding location (the top left EGG location 36), rather than to the holding location display representing the default holding locations 36, which in the case illustrated in FIG. 11 already contained food.

Figure 13:
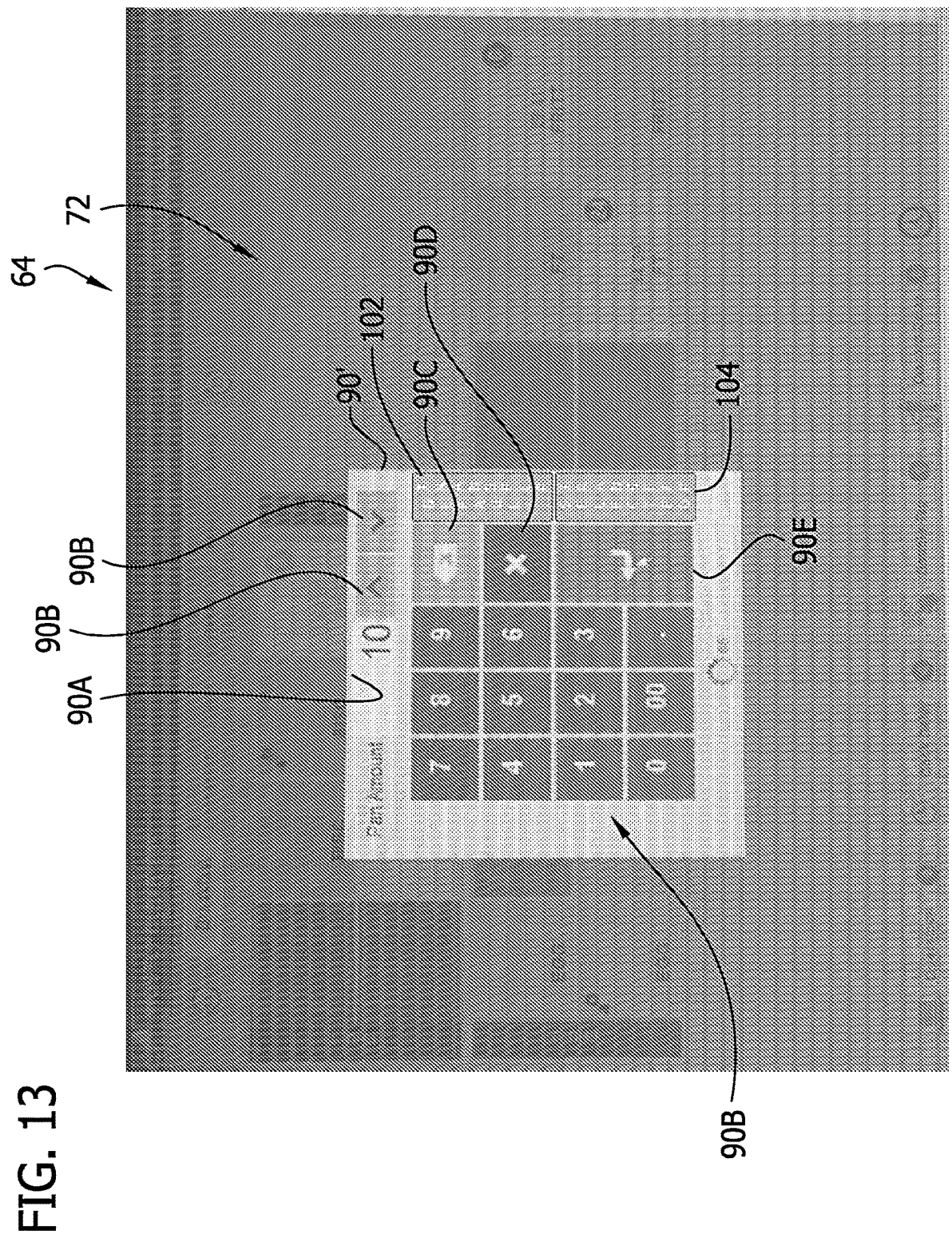

It will be appreciated that default and selected transfer operations may be initiated and executed in other fashions without departing from the scope of the present invention. For example, as shown in FIG. 13, a transfer may be initiated by briefly tapping the holding location display 80 of the origin location to bring up a prompt window 90' similar to the window 90 shown in FIG. 5. The prompt window 90' includes the same features of the window 90 described above and also includes two transfer buttons, namely a default (primary) transfer button 102 and a selected transfer button 104. If the default transfer button 102 is used, the prompt window 90' would disappear, and the food amount indicator 80C and hold time indicator 80B would transfer to the default holding location display 80. If the selected transfer button 104 were used, the prompt window 90' would disappear, and the food amount indicator 80C and hold time indicator 80B would transfer to a selected destination holding location display after it is tapped by the employee. In other words, using the selected transfer button 104 overrides the instructions in the tangible storage medium 44 identifying the default destination holding location as the only destination holding location and permits the user to select a desired destination holding location. As another example, the button 89 of the origin holding location display 80 could be actuated by the "sustained pressing and dragging" user engagement type mentioned above, in which the dragging is toward the default holding location and the user engagement is released before reaching the default holding location, could initiate or execute the default transfer. The controller 42 may be responsive to the dragging to show the holding location display 80 or other image moving on the touch screen display 64 in the direction of the dragging. Moreover, if the user desired to perform a selected transfer to a location 36 other than the default holding location, the user could sustained press the button 89, drag the holding location display 80 or other representative image, and drop it on a selected destination holding location display.

In one embodiment, the control system 40 may include at least one sensor 110 used for initiating a transfer. For example, as shown in FIGS. 1, 2, and 18, sensors 110 may be provided on the food holding apparatus 20 at respective food holding locations 36. The sensors 110 may be adapted for sensing whether food is present at the holding locations 36. Various types of sensors 100 may be used, such as weight sensors, pressure sensors, presence sensors, optical sensors, or other types of sensors. For example, if the primary holding location for a particular type of food is indicated on its holding location display 80 as not holding food, and a sensor 110 associated with a holding location 36 indicated as holding food of the same type signals the control system 40 that the pan has been removed from that holding location, the control system may automatically initiate or execute a default transfer, i.e., transfer the food amount indicator 80C and hold time indicator 80B to the primary (default) holding location display. It is assumed that the employee has removed the food from the non-primary holding location 36 to transfer the food to the primary holding location from which the food will be served. Moreover, if a sensor 110 in the default destination holding location (e.g., primary holding location) signals the controller 42 that there is no food present in that location, and the controller may execute instructions stored in the tangible storage medium 44 for initiating or executing a default transfer of food held in another holding location to the default destination holding location. For example, when the primary (default destination) holding location for a particular food type becomes empty, and food of that type is being held in another holding location, the controller 42 may provide a prompt or alert to the user, or provide a suggestion to the user which they may accept or decline via user input, to transfer the food to the default destination holding location (e.g., upon the user accepting via user input). A similar default transfer could be initiated or executed by the controller 42 without using a sensor 110 but instead monitoring statuses of holding locations (as displayed by the holding location displays). For example, if a default destination (primary) holding location for a particular type of food is indicated by its holding location display 80 as not holding food, and another holding location is indicated by its holding location display as holding that type of food, the controller 42 may initiate or execute a default transfer from that holding location to the default destination holding location. If more than two holding locations 36 other than the default destination holding location are shown as holding food, the origin holding location for the default transfer would be identified as the holding location having a "serve first" status (e.g., green color displayed by the respective holding location display 80). This step of identifying the origin holding location between two potential origin holding locations could also be used in a transfer involving a sensor signaling the default destination holding location is not holding food.

When food at a holding location 36 is indicated on its holding location display 80 as containing expired food (hold time elapsed, e.g., "0:00"), the amount of expired food represented as held in the holding location may be updated. For example, to indicate to the control system 40 that the expired food is being discarded, the employee may tap on the holding location display 80 representative of the relevant holding location 36. The prompt window 90 such as shown in FIG. 5 would appear. The food amount last indicated by the food amount indicator 80C would appear in the food amount input field 90A. This amount represents the suggested amount of wasted food. If the amount is correct, the employee may use the waste button 90D to reset or clear the holding location display 80 (i.e., remove the hold time indicator 80B and food amount indicator 80C, and change the displayed status from "food held" to "food not held"

such as by color change). If the amount is incorrect (e.g., not accurately representative of the amount of food in the pan to be discarded), the employee may correct the amount using the delete button 90C and/or the number buttons 90B and then use the waste button 90D to reset/clear the holding location display 80. The control system 40 logs the amount of food last shown in the food amount input field 90A in the tangible storage medium 44 as wasted food. After the holding location display 80 has been cleared (i.e., the food has been wasted), the holding location display no longer shows a hold time indicator 80B or food amount indicator 80C, shows "no food held" status, and is ready for the employee to initiate another hold sequence per the steps described above.

In view of the discussion above, it will be appreciated that the buttons 89 of the touch screen display 64 associated with the holding locations 36 permit execution of different operations by different activations or actuations of the buttons by different types of user engagement with the buttons. For example, in one embodiment, as described above, tapping (a first type of engagement) of a button 89 for a holding location display 80 brings up the prompt window 90 (e.g., from which the amount of food indicated as stored at the location 36 can be changed or a transfer may be initiated), and long holding or sustained pressing (a second type of engagement) of the button executes a transfer. In other embodiments, a default transfer may be initiated or executed by tapping and a selected transfer may be initiated or executed by long holding. As also described above, upon inserting food into a previously empty holding location 36, tapping the button 89 associated with the holding location display 80 may bring up the prompt window 90, and sustained pressing the button may automatically enter the suggested amount of food (e.g., previously displayed on the cook list). Moreover, as also described above, upon expiration of the hold time, tapping the button 89 may bring up the prompt window 90 (where the amount of food to be wasted can be modified), and long holding the button may automatically log the suggested amount of food as waste and change the displayed status of the holding location 36 to "no food held." It will be understood that other operations may be executed based on other types of engagements with the touch screen display, and the operations initiated or executed by tapping, long holding, or other types of engagements may be switched or interchanged without departing from the scope of the present invention. It will be appreciated that the appearance of the buttons 89 is substantially the same for a particular food holding location display among the various holding location statuses, other than the updating of displayed information representative of the status of the holding location in the touch sensitive area of the holding location display defining the button. For example, a button appears substantially the same among holding location statuses except for the updating of displayed indicators representing food type, amount, hold time, whether food is present, whether food should be served first or second, and whether food is expired. However, other configurations may be used without departing from the scope of the present invention.

In another aspect of the present invention, the cook list section 70 may display food types to cook in order of floating priority. This will be described with reference to FIGS. 14-16, which illustrate schematically a cook list 70B' that may be displayed in the cook list section 70 of the view of the touch screen display 64 of FIG. 3. It will be appreciated that the cook list 70B' illustrated in FIGS. 13-16 is specifically for an oven, and cook lists for other appliances and global cook lists (including food types cooked by different appliances) may be used according to the principles explained herein (e.g., as shown in FIG. 3), without departing from the scope of the present invention. The cook lists may be updated in substantially real-time, on a delayed basis, and/or periodically, based on the determined priority for cooking certain food types. Priority for cooking certain types of food may be determined by a ratio of "inventory" versus "need." The food that is in inventory (on hand) includes the food ready to be served (e.g., cooked food) and can be determined by summing the amount of food of the particular type indicated as currently held in the food holding apparatus 20 (e.g., summing the amount represented by the food amount indicators 80C for all holding locations 36 holding that food type). The amount of food of each type that is needed (demand) can be determined by forecasting or predicting, as described above, for predetermined intervals of time. For example, if it is predicted 10 biscuits will be needed in the next 30 minutes (or other pre-determined time increment or increments), and there are 5 biscuits currently in inventory, the ratio of inventory versus need for biscuits would be 5:10 or 50%. If it is predicted 10 cookies will be needed in the next 30 minutes, and there are 3 cookies in inventory, the ratio of inventory versus need for cookies would be 3:10 or 30%. Accordingly, cookies (e.g., "7 COOKIE") would be displayed on the oven cook list 70B' as having higher priority (e.g., above) biscuits (e.g., "5 BISC"). This is illustrated in the cook list 70B' shown in FIG. 14. In general, food types having smaller inventory versus need (e.g., expressed as percentage or fraction) are ranked higher in priority on the cook list than food types having greater inventory versus need. It will be understood that the ratio of inventory versus need can also be expressed as need versus inventory, in which case the food types having higher need versus inventory would be ranked higher in priority on the cook list than food types having lesser need versus inventory. Moreover, it will be understood priority can be determined as a function of inventory and need in other ways without departing from the scope of the present invention. For example, factors, parameters, and/or multipliers in addition to the ratio can be included in determining priority, and the ratio can account for or be a function of other factors, parameters, and/or multipliers.

Figure 15:
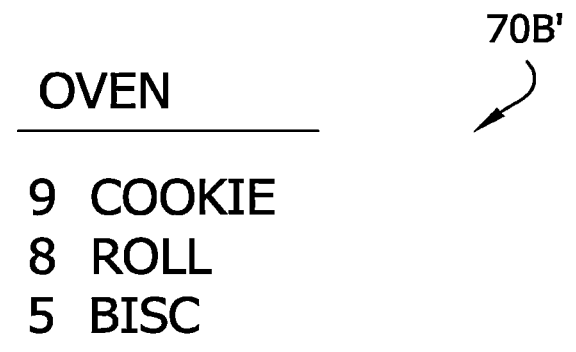

The ratio of inventory versus need of a particular food type may change over time, and the cook lists may be updated to reflect the changed priority. The tangible storage medium 44 can store the cook list and priority information (e.g., in data structures), and the controller 42 can update the priority information and modify the cook list accordingly. Continuing with the example from above, if the point-of-sale device 24 indicates to the control system 40 that a customer has recently ordered two cookies, the inventory of the cookies will be updated to 1 cookie (2 less cookies than before). The food amount indicator 80C on the holding location display 80 associated with the holding location holding cookies from which they are being served (e.g., the primary holding location) would be updated to 1 from 3. Accordingly, the ratio of inventory to need of cookies would reduce to 10%, meaning there would be increased priority to cook cookies. If the updated inventory to need of cookies changed the relative priority on the cook list 70B' (e.g., relative to rolls at 20%), cookies would move higher on the oven cook list (e.g., "9 COOKIE"), as shown in FIG. 15. On the other hand, if the inventory of cookies increased (e.g., 6 cookies were baked and supplied to the food holding apparatus 20, as indicated to the control system 40 by the employee using the user interface 46 or specifically the touch screen display 64), the decreased priority for preparing cookies may move it lower on the cook list 70B'. If the amount of a particular food type in inventory is less than the amount of that food type currently ordered by customers, that food type may be indicated with particular importance to the employees to be cooked (e.g., on top of the cook list, flashing, bolded, underlined, or highlighted, etc.). For example, FIG. 16 illustrates emphasis for cooking "10 COOKIE," which is bolded, underlined, and highlighted. Moreover, what is considered to be in inventory may be updated to account for hold time remaining and/or cook time for that particular food type. For example, if 10 cookies are needed, and the control system 40 indicates 3 cookies are in inventory, but the hold time remaining for the 3 cookies is less than the time required to cook new cookies, the "inventory" of cookies for purposes of the inventory versus need ratio may be considered to be 0. Accordingly, the ratio would be 0% when the remaining hold time is less than the time required to cook new cookies, and the cookies (e.g., "10 COOKIE") may move higher on the oven cook list 70B' and/or be emphasized as having high priority (e.g., on top of the cook list, flashing, bolded, underlined, or highlighted, etc.), as shown in FIG. 16. Moreover, as time elapses, the amount of food of a particular food type needed to fill expected orders may change, which could accordingly affect the inventory versus need ratio.

If desired, a food type listed on the cook list 70B' may be "held" or "locked" in position (priority) on the list by user engagement (e.g., tapping, long holding, etc.) the associated line item (e.g., the food type indicator) on the cook list. For example, if the particular food type is currently being cooked, it may be desirable to hold its position on the cook list until cooking of food of that food type is finished and the cooked food is supplied to the food holding apparatus 20. After food is cooked and supplied to the food holding apparatus 20, the control system 40 knows cooking of the food has finished, based on entry of the food into a holding location (from an employee using the touch screen display 64 to enter the food into a holding location). In response, the control system 40 may reduce the amount of that food type shown on the cook list as needing to be cooked or remove it from the cook list, as necessary.

It will be appreciated that features of the cook list 70B' described above can be applied to types of food processing other than cooking. For example, a prioritized food type list similar to the cook list 70B' can be used for identifying and listing food types to be processed (in other ways than cooking) in order of determined priority. Food processing can include thawing, cutting, portioning, moving, assembling, packaging, holding, and/or other types of processing. The priority for processing a particular food type can be determined as a function of an amount of food of that food type in inventory and an amount of that food type needed to be processed, exactly as described above with respect to processing by cooking. The priority for food types on the prioritized food type list can be updated, and the order of the food types on the prioritized food type list can be changed based on the updated determined priority. Any of the features described above with respect to the cook list could be applied to the prioritized food type list.

Figure 17:
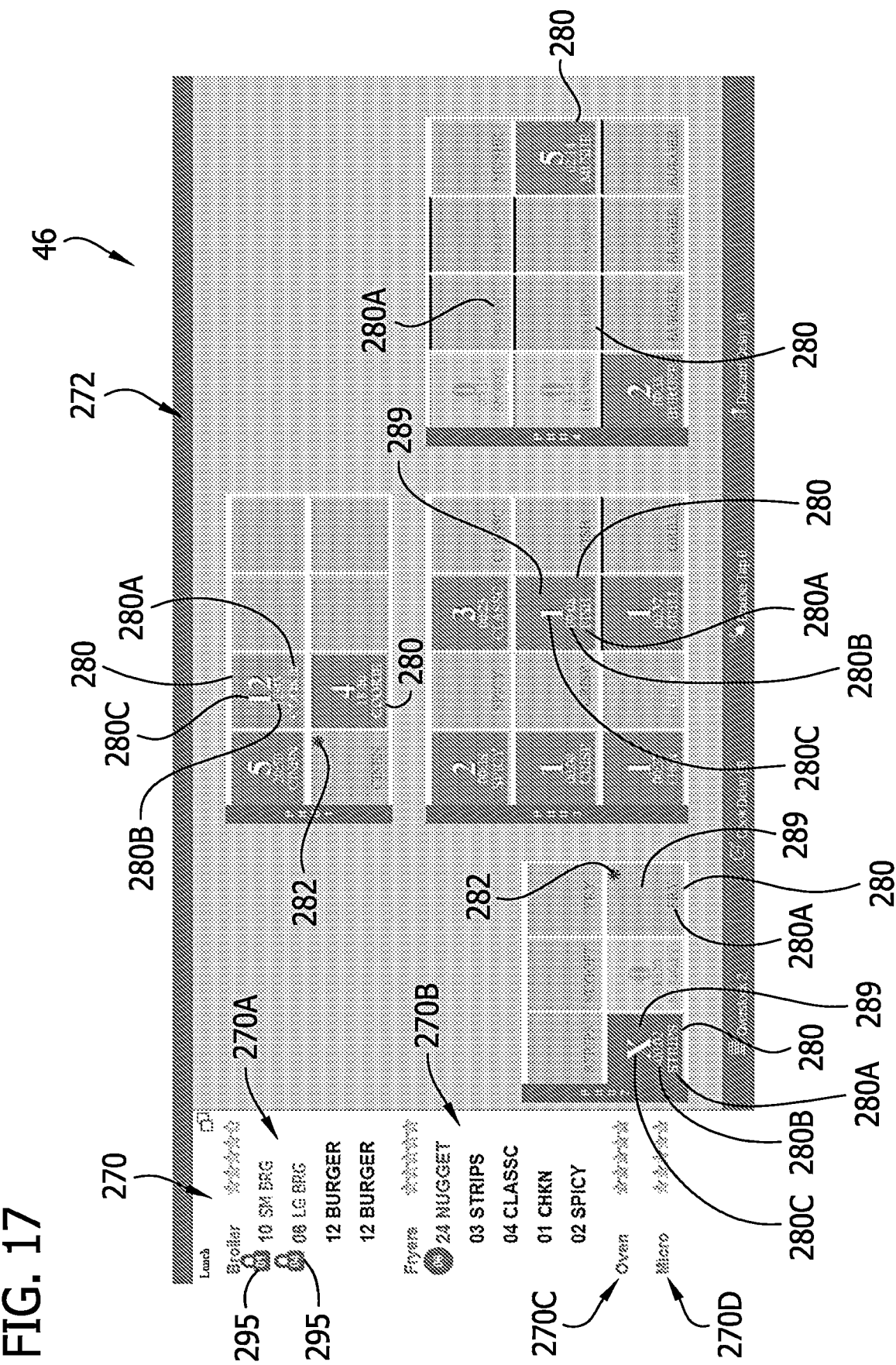
FIG. 17 is a photograph of a screenshot of a graphic interface of a second embodiment of the present invention.

FIG. 17 illustrates a second embodiment of a screen (graphic interface) that may be displayed on the user interface 46 (e.g., the touch screen display 64) for use with the control system 40. The second embodiment is very similar to the embodiment shown in FIGS. 3-13 and described above, and like parts are designated with like reference numbers, plus 200. It will be understood the second embodiment can function essentially the same as described above with respect to the first embodiment and includes features described hereafter.

As with the previous embodiment, the view shown in FIG. 17 includes a left side cook list section 270 indicating food to be cooked, and a right side food holding apparatus status indication section 272 showing status of holding locations 36. The food holding apparatus status indication section 272 includes an array of holding location displays 280. Active holding location displays 280 include food type indicators 280A, and holding location displays representing holding locations where food is held additionally include hold time indicators 280B and food amount indicators 280C. The holding location displays 280 also include buttons 289. In this embodiment, colors are used on the holding location displays 280 as explained with respect to the first embodiment to indicate statuses such as "no food present," "food present," "food suitable for serving," "food to be served first," "food to be served second," and "food expired or to be discarded." In this embodiment, colors are displayed in the background of the holding compartment displays 280. For example, referring to the "COOKIE" holding location displays 280, the upper cookie holding location is indicated by a yellow or amber colored holding location display background (serve second), and the lower cookie holding location is indicated by a green holding location display background (serve first). Referring to the lower "STRIPS" holding location display 280, it is shown as having a red holding location display background (expired). The color convention is the same as described above to indicate to a user that food is present at the holding locations and whether it should be served first, second, or discarded. Referring again to the lower "STRIPS" holding location display 280, the food amount indicator 280C is an "X" representing no food amount held suitable for serving. The hold time indicator 280B shows "−00:02" representing two seconds of discard delay time have accrued. The hold time indicator 280B will count up (in negative time) to provide a continuously updated indication of "hold time," and in this case the hold time represents how long the food at the holding location has been expired without being discarded.

The second embodiment also includes primary (default destination) holding location indicators 282 that serve the same purpose as the indicators 82 described above with respect to the first embodiment. The primary holding location indicators 282 distinguish the holding locations as primary holding locations and desirably also default destination holding locations for default transfers. In this embodiment, the holding location indicators 282 are provided in the form of an asterisk. It will be understood other indicators such as other symbols can be used without departing form the scope of the present invention. In this embodiment, the primary holding location indicators 282 are not displayed on the respective holding location displays 280 when the holding location display indicates the holding location is holding food. When food is held in the a primary holding location, presumably the respective food holding location display 280 indicates the status as being "serve first" because the longest held (or soonest to expire) food would be present in that holding location. This serves as sufficient indication to the employee to serve from the primary holding location. For example, the left "FISH" holding location display 280 represents the primary holding location for fish and would display a primary holding location status indicator if not indicating that the holding location is holding food (food amount indicator 280C representing "1", hold time indicator 280B representing "00:08" remaining before expiration, green background indicating "serve first").

The cook list section 270 includes a plurality of cook lists 270A, 270B, 270C, 270D corresponding to different cooking devices including the fryers broiler 18, fryers 12, ovens 10, and microwave 14. The food types to be cooked are indicated by a food type indicator such as a full or abbreviated name of the type of food (e.g., "SM BRG" for small burger patties, "LG BRG" for large burger patties, etc. and an amount of that food type to be cooked (e.g., "10" for "SM BRG," "6" for "LG BRG"), which together may be referred to as a line item. It will be appreciated that the cook lists 270A-270D have the same prioritizing features as described above with respect to the cook list 70B' of FIGS. 14-16. Food types listed on the cook lists 270A-270D are listed in order of determined priority (e.g., function of inventory and need), the priority for each food type can be updated, and the food types can be held or locked in position (priority) on the cook list, all as described above. In this embodiment, food types locked on the cook lists are indicated by lock indicators 295, which can be lock symbols, as shown in the illustrated embodiment on the Broiler cook list 270A for the food type "SM BRG" and the food type "LG BRG." Other lock indicators, such as other symbols, may be used without departing from the scope of the present invention. The numbers shown in the lock symbols 295 represent an amount of food of the respective food type currently ordered (recent unfilled customer order) for which there is no food in inventory. Those numbers, along with red coloring of the lock symbol 295 and food type line item serves to emphasize the importance of cooking the food type to the user. Moreover, locking of a food type may cause that food type to move to the highest priority position on the cook list (e.g., the top of the list) if the food type is not already at the highest priority position. When a food type is locked on the cook list, the controller 42 may log in the tangible storage medium a record indicating cooking of that food type (e.g., the amount shown on the cook list) has begun. This may be helpful to the controller 42 in monitoring inventory of food.

The Title, Field of Invention, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field of Invention, and Background are not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

OTHER STATEMENTS OF INVENTION

The following are statements of invention described in the present application. Although some of the following statements are not currently presented as claims, the statements are believed to be patentable and may subsequently be presented as claims. Associated methods, such as methods corresponding to statements of apparatus or systems below, are also believed to be patentable and may subsequently be presented as claims.

A1. A food management control system for managing food in a food holding apparatus, said food holding apparatus having a plurality of food holding locations including at least an origin holding location and a destination holding location for receiving food transferred from the origin location, the food management control system including
a food management controller configured for managing an inventory of food and monitoring hold times associated with the food holding locations including the origin and destination holding locations, and
a tangible storage medium storing a data structure identifying a hold time as being associated with the origin holding location, the tangible storage medium including food management controller executable instructions stored therein, said instructions, when executed by the food management controller, identifying the destination holding location as a default destination holding location among the plurality of food holding locations, the tangible storage medium including food management controller executable instructions for executing a default transfer in which the food management controller modifies the data structure to identify the hold time as being associated with the default destination holding location.

A2. A food management control system as set forth in claim A1 further comprising an origin holding location display associated with the origin holding location and a destination holding location display associated with the destination holding location, wherein the tangible storage medium includes food management controller executable instructions for, before the default transfer, displaying on the origin holding location display a food status indicator representative of the hold time, and food management controller executable instructions for, after the default transfer, displaying on the default destination holding location display a food status indicator representative of the transferred hold time.

A3. A food management control system as set forth in claim A2 wherein the food status indicator displayed on the destination holding location display includes a timer representative of the hold time.

A4. A food management control system as set forth in claim A2 wherein the food status indicator displayed on the destination holding location display includes a color representative of the hold time.

A5. A food management control system as set forth in claim A1 further comprising a user interface including holding location displays associated with respective food holding locations including the origin holding location and destination holding location, wherein the holding location displays are arranged in an array corresponding to an arrangement of the holding locations, and the origin holding location display and destination holding location display are positioned in the array corresponding to positions of the respective origin and destination holding locations in the arrangement.

A6. A food management control system as set forth in claim A5 wherein the tangible storage medium includes food management controller executable instructions for displaying a default destination holding location indicator on the holding location display associated with the holding location identified in the identifying instructions as the default destination holding location to visually distinguish to a user said holding location as the default destination holding location.

A7. A food management control system as set forth in claim A5 wherein the tangible storage medium includes food management controller executable instructions for displaying food type indicators on the holding location displays for indicating a type of food to be held at the holding locations.

A8. A food management control system as set forth in claim A7 wherein the food type indicators displayed on the holding location displays associated with the origin and destination holding locations indicate the same type of food is to be held at the origin and destination holding locations.

A9. A food management control system as set forth in claim A5 wherein the user interface comprises a touch screen display, and the holding location displays associated with the origin and destination holding locations are sections of the touch screen display.

A10. A food management control system as set forth in claim A1 wherein the destination holding location is a first destination holding location and the holding apparatus further comprises a second destination holding location, the identifying instructions identifying the first destination holding location and not the second destination holding location as the default destination holding location among the first and second destination holding locations.

A11. A food management control system as set forth in claim A10 further comprising a user interface including holding location displays associated with respective ones of the first and second destination holding locations, wherein the tangible storage medium includes food management controller executable instructions for displaying a food type indicator on the holding location displays to indicate a type of food to be held at the holding locations, and wherein the food type indicators displayed on the holding location displays associated with the first and second destination holding locations indicate the same type of food is to be held at the first and second destination holding locations.

A12. A food management control system as set forth in claim A10 further comprising a user interface configured for receiving user input, and wherein the food management controller is responsive to user input to change the identifying instructions to identify the second destination holding location as the default destination holding location instead of the first destination holding location.

A13. A food management control system as set forth in claim A1 further comprising a user interface configured for receiving user input, and wherein the food management controller is responsive to user input to initiate the default transfer.

A14. A food management control system as set forth in claim A1 wherein the food holding apparatus includes a sensor configured for sensing whether food is present in the origin holding location, and the tangible storage medium includes food management controller executable instructions for initiating the default transfer as a function of a signal from said sensor.

A15. A food management control system as set forth in claim A1 wherein the food holding apparatus includes a sensor configured for sensing whether food is present in the destination holding location identified in the identifying instructions as the default holding location, and the tangible storage medium includes food management controller executable instructions for initiating the default transfer as a function of a signal from said sensor indicating no food is held in the default destination holding location.

A16. A food management control system as set forth in claim A1 further comprising a user interface configured for receiving user input, and wherein the tangible storage medium includes food management controller executable override instructions responsive to user input designating a different holding location than the default holding location as the destination holding location for a selected transfer and wherein the identifying instructions identify the default holding location as the only destination holding location unless the override instructions have been executed prior to execution of the identifying instructions.

A17. A food management control system as set forth in claim A1 wherein the tangible storage medium includes a second data structure identifying an amount of food as being associated with the origin holding location, the food management controller being configured for monitoring the amount of food held at the origin holding location, the food management controller being configured to, in the default transfer, modify the second data structure to identify the amount of food as being associated with the default destination holding location and configured to thereafter monitor the amount of food held at the default destination holding location.

A18. A food management control system as set forth in claim A17 further comprising an origin holding location display associated with the origin holding location and a destination holding location display associated with the destination holding location, wherein the tangible storage medium includes food management controller executable instructions for, before the default transfer, displaying on the origin holding location display an indicator representative of the amount of food held at the origin holding location, and food management controller executable instructions for, after the default transfer, displaying on the destination holding location display a food status indicator representative of the transferred amount of food.

A19. A food management system including the food management control system as set forth in claim A1 in combination with the food holding apparatus having the plurality of food holding locations including the origin holding location and the destination holding location.

AM1. A computer executable method for use with food holding apparatus having a plurality of food holding locations including at least an origin holding location and a destination holding location to which food from the origin holding location can be transferred, the method including:

storing a data structure in a tangible storage medium identifying a hold time as being associated with the origin holding location, monitoring, with a food management controller, the hold time associated with the origin holding location, referencing, with the food management controller, instructions stored in the tangible storage medium identifying a holding location among the plurality of the holding locations as a default holding location for receiving the hold time in a default transfer, executing, with the food management controller, instructions stored in the tangible storage medium to execute the default transfer including modifying the data structure to identify the hold time as being associated with the default destination holding location.

B1. A food management control system for managing food in a food holding apparatus, said food holding apparatus having at least a first holding location and a second holding location, the food management control system including a food management controller configured for monitoring hold times associated with the first and second holding locations, a user interface including at least first and second holding location displays for displaying information associated with the respective first and second holding locations, the first and second holding location displays being arranged in an array corresponding to an arrangement of the respective first and second holding locations, and the first and second holding location displays being positioned in the array corresponding to positions of the respective first and second holding locations in the arrangement, and a tangible storage medium storing a data structure identifying the first holding location as a primary holding location, the tangible storage medium having food management controller executable instructions stored therein, said instructions, when executed by the food management controller, displaying a primary holding location indicator on the first holding location display for distinguishing the first holding location from the second holding location as the primary holding location, the primary holding location indicator indicating to a user to place food at the first holding location instead of the second holding location when the first and second holding locations are not holding food and to transfer food from the second holding location to the first holding location if the first holding location is not holding food.

B2. A food management control system as set forth in claim B1 wherein the primary holding location indicator is not representative of a length of food hold time.

B3. A food management control system as set forth in claim B1 wherein when the first and second food holding locations are active and not holding food the holding location displays have substantially the same appearance except for the primary holding location indicator distinguishing the first holding location from the second holding location.

B4. A food management control system as set forth in claim B1 wherein the primary holding location indicator is a symbol.

B5. A food management control system as set forth in claim B1 wherein the user interface comprises a touch screen display and the first and second holding location displays are sections of the touch screen display.

B6. A food management control system as set forth in claim B5 wherein the first and second holding location displays include outlines representing the respective first and second holding locations, and the primary holding location indicator is displayed in the outline of the first holding location display.

B7. A food management control system as set forth in claim B1 wherein the first holding location display is positioned at a bottom left side of said array.

B8. A food management control system as set forth in claim B1 wherein the tangible storage medium includes food management controller executable instructions for displaying on the first and second holding location displays food status indicators representative of hold times associated with the respective first and second hold times.

B9. A food management control system as set forth in claim B1 wherein the tangible storage medium includes food management controller executable instructions for displaying a food type indicator on the holding location displays for indicating a type of food to be held at the holding locations.

B10. A food management control system as set forth in claim B9 wherein the food type indicators displayed on the holding location displays indicate the same type of food is to be held at the first and second holding locations.

B11. A food management control system as set forth in claim B1 wherein the tangible storage medium includes food management controller executable instructions for displaying on the first and second holding location displays food status indicators representative of whether food held at the respective holding location should be served first relative to food held at another holding location, whether food stored at the respective holding location should be served second relative to food held at another holding location, and whether food stored at the respective holding location is expired.

B12. A food management control system as set forth in claim B11 wherein the tangible storage medium includes food management controller executable instructions for displaying on the first holding location display a status indicator representative of no food being held at the first holding location, and the tangible storage medium includes food management controller executable instructions for initiating a transfer of food from the second holding location to the first holding location when the second holding location display displays the status indicator representing food held at the second holding location should be served first relative to food held at another holding location and the first holding location display displays the status indicator representative of no food being held at the first holding location.

B13. A food management control system as set forth in claim B11 wherein the food holding apparatus includes a sensor configured for sensing whether food is present in the first holding location, and the tangible storage medium includes food management controller executable instructions for initiating a transfer of food from the second holding location to the first holding location when the second holding location display displays the status indicator representing food held at the second holding location should be served first relative to food held at another holding location and as a function of a signal from said sensor indicating no food is held at the first holding location.

B14. A food management control system as set forth in claim B1 wherein the user interface is configured for receiving user input to inform the food management controller the user is placing food at the second holding location, and wherein the tangible storage medium includes food management controller executable instructions responsive to user input for prompting the user to place the food at the first holding location if the user attempts to place the food at the second holding location and no food is held at the first holding location.

B15. A food management control system as set forth in claim B1 wherein the tangible storage medium includes food management controller executable instructions for displaying on the first holding location display a food held status indicator representative of food being held at the first holding location, and the tangible storage medium includes food management controller executable instructions for not displaying the primary holding location indicator on the first holding location display when the food held status indicator is displayed on the first holding location display.

B16. A food management control system as set forth in claim B1 wherein the user interface is configured for receiving user input, and wherein the food management controller is responsive to user input to modify the data structure to identify the second holding location as the primary holding location, and wherein the food management controller is responsive thereto to display the primary holding location indicator on the second holding location display instead of the first holding location display.

C1. A restaurant food management control system for managing an inventory of cooked food, the restaurant food management control system including
a user interface for displaying a cook list of food types to be cooked for adding to the inventory of cooked food, a food management controller configured for managing the inventory of cooked food, monitoring a need for cooked food, and determining food types needed to be cooked, a tangible storage medium storing the cook list, the tangible storage medium having food management controller executable instructions stored therein, said instructions, when executed by the food management controller, determining a priority for each food type on the cook list as a function of an amount of food of that food type in the inventory and an amount of food of that food type needed to be cooked, and the tangible storage medium storing food management controller executable instructions, when executed by the food management controller, modifying the cook list to arrange the food types on the cook list in order of the determined priority.

C2. A restaurant food management control system as set forth in claim C1 wherein the tangible storage medium stores a data structure, the data structure including the determined priority for each food type on the cook list, the tangible storage medium having food management controller executable instructions for modifying the second data structure with updated determined priority for each food type on the cook list and for changing the order of the food types on the cook list based on the updated determined priority.

C3. A restaurant food management control system as set forth in claim C2 wherein the tangible storage medium includes food management controller executable instructions for locking a food type in position on the cook list to hold the food type in position on the cook list.

C4. A restaurant food management control system as set forth in claim C1 wherein the tangible storage medium includes food management controller executable instructions for determining the priority for each food type on the cook list as a function of a ratio including an amount of food of that food type in the inventory and an amount of food of that food type needed to be cooked.

C5. A restaurant food management control system as set forth in claim C1 wherein the tangible storage medium includes food management controller executable instructions for determining the priority for each food type on the cook list as a function of a ratio of an amount of food of that food type in the inventory to an amount of food of that food type needed to be cooked.

C6. A restaurant food management control system as set forth in claim C1 wherein the food management controller is configured for monitoring an amount of each food type held in inventory at a plurality of holding locations of a holding apparatus, and the tangible storage medium includes food management controller executable instructions for determining inventory of cooked food as a function of the amount of cooked food at the plurality of holding locations.

C7. A restaurant food management control system as set forth in claim C1 wherein the tangible storage medium includes food management controller executable instructions for determining the need for cooked food as a function of forecasted customer orders.

C8. A restaurant food management control system as set forth in claim C7 further comprising a point of sale device for receiving customer orders, the point of sale device being in operative communication with the food management controller, and wherein the tangible storage medium includes food management controller executable instructions for determining the need for cooked food as a function of recent unfilled customer orders.

C9. A restaurant food management control system as set forth in claim C1 further comprising a point of sale device for receiving customer orders in operative communication with the food management controller, and wherein the food management controller determines the need for cooked food as a function of recent unfilled customer orders.

C10. A restaurant food management control system as set forth in claim C9 wherein when the food management controller determines unfilled customer orders for a food type outnumber the amount of food of that food type in inventory, the food management controller emphasizes that food type on the cook list with increased importance relative to the other food types on the cook list.

C11. A restaurant food management control system as set forth in claim C1 wherein the cook list displays amounts of each food type to be cooked.

C12. A restaurant food management control system as set forth in claim C1 wherein the tangible storage medium includes food management controller executable instructions for locking a food type in position on the cook list to hold the food type in position on the cook list.

C13. A restaurant food management control system as set forth in claim C12 wherein the user interface is configured for receiving user input, and the food management controller is responsive to user input to lock a selected food type on the cook list.

C14. A restaurant food management control system as set forth in claim C13 wherein the tangible storage medium includes food management controller executable instructions for moving a food type selected by the user to a highest priority position on the cook list if the food type was not already at the highest priority position.

C15. A restaurant food management control system as set forth in claim C13 wherein the user interface is a touch screen display, and the food management controller is responsive to the touch of a user on the touch screen display selecting a food type on the cook list for locking the selected food type.

C16. A restaurant food management control system as set forth in claim C12 wherein the tangible storage medium includes food management controller executable instructions for displaying a lock indicator on the cook list associated with a locked food type.

C17. A restaurant food management control system as set forth in claim C16 wherein each food type on the cook list is indicated on the cook list by a line item including at least one of text and an image representing the food type, and wherein the lock indicator includes a symbol adjacent the line item.

C18. A restaurant food management control system as set forth in claim C16 wherein the food management controller unlocks a locked food type on the cook list as a function of a food inventory signal representing an amount of the locked food type has been added to inventory.

C19. A restaurant food management control system as set forth in claim C18 wherein the user interface is configured for receiving user input for generating the food inventory signal.

C20. A restaurant food management control system as set forth in claim C19 wherein the user interface includes a plurality of holding location displays associated with respective holding locations of a holding apparatus for holding cooked food in the inventory, the holding location displays being configured for receiving user input representing an amount of the locked food type has been added to one of the plurality of holding locations for generating the food inventory signal.

C21. A restaurant food management control system as set forth in claim C18 further comprising a sensor associated with a holding location of holding apparatus for holding cooked food of the locked food type in the inventory, the sensor being configured for generating the food inventory signal in response to detecting food supplied to the holding location.

C22. A restaurant food management control system as set forth in claim C12 wherein in response to a food type being locked on the cook list the food management controller records a record in the tangible storage medium representing cooking of that food type has begun.

C23. A restaurant food management control system as set forth in claim C22 wherein the cook list displays amounts of each food type to be cooked, and the record recorded by the food management controller in the tangible storage medium includes the amount of food of the locked food type.

CA1. A food management control system for managing an inventory of processed food, the food management control system including
a user interface for displaying a prioritized food type list of food types to be processed for adding to the inventory of processed food,
a food management controller configured for managing the inventory of processed food, monitoring a need for processed food, and determining food types needed to be processed,
a tangible storage medium storing the prioritized food type list, the tangible storage medium having food management controller executable instructions stored therein, said instructions, when executed by the food management controller, determining a priority for each food type on the prioritized food type list as a function of an amount of food of that food type in the inventory and an amount of food of that food type needed to be processed, and the tangible storage medium storing food management controller executable instructions for modifying the prioritized food type list to arrange the food types on the prioritized food type list in order of the determined priority.

D1. A food management system for managing food in a food holding apparatus having a plurality of holding locations, the food management system including
a food management controller configured for monitoring a status of the plurality of holding locations,
a user interface including a plurality of holding location displays associated with respective holding locations for displaying information associated with the holding locations, the holding location displays being arranged in an array corresponding to an arrangement of the respective holding locations, the holding location displays being positioned in the array corresponding to positions of the respective holding locations in the arrangement, each holding location display including a touch sensitive area defining a button that can be actuated by at least a first type of user engagement with the button,
a tangible storage medium having food management controller executable instructions stored therein, said instructions, when executed by the food management controller, displaying on each holding location display information associated with the status of the respective holding location, the tangible storage medium storing food management controller executable instructions for executing a first operation in response to the first type of user engagement with the button when a first holding location status is displayed on the holding location display and for executing a second operation different than the first operation in response to the first type of user engagement with the button when a second holding location status is displayed on the holding location display.

D2. A food management control system as set forth in claim D1 wherein the first displayed holding location status represents no food is held at the holding location.

D3. A food management control system as set forth in claim D2 wherein the first operation executed by the first engagement is the food management processor recording in the tangible storage medium an amount of food as being held at the respective holding location.

D4. A food management control system as set forth in claim D1 wherein the second displayed holding location status represents food is held at the holding location.

D5. A food management control system as set forth in claim D4 wherein the second operation executed by the first engagement is the food management processor transferring association of an amount of food held at the holding location to a different holding location.

D6. A food management control system as set forth in claim D1 wherein the second displayed holding location status represents an expired hold time associated with the respective holding location.

D7. A food management control system as set forth in claim D6 wherein the second operation executed by the first engagement is the food management processor changing the holding location status to represent no food is held at the holding location.

D8. A food management control system as set forth in claim D6 wherein the operation executed by the first engagement is the food management processor recording as waste in the tangible storage medium an amount of food last held at the holding location.

D9. A food management control system as set forth in claim D1 wherein the tangible storage medium includes food management controller executable instructions for executing a third operation in response to the first type of user engagement with the button when a third holding location status is displayed on the holding location display.

D10. A food management control system as set forth in claim D9 wherein the third displayed holding location status represents an expired hold time associated with the respective holding location.

D11. A food management control system as set forth in claim D1 wherein the button includes a boundary substantially coextensive with the holding location display.

D12. A food management control system as set forth in claim D1 wherein the button includes a boundary indicated on the holding location display by a border.

D13. A food management control system as set forth in claim D1 wherein the holding location display displays information representative of the status of the holding location in the touch sensitive area of the holding location display defining the button.

D14. A food management control system as set forth in claim D13 wherein an appearance of the button when the first holding location status is displayed on the holding location display is substantially the same as an appearance of the button when the second holding location status is displayed on the holding location display except for updating of displayed information representative of the status of the holding location in the touch sensitive area of the holding location display defining the button.

D15. A food management control system as set forth in claim D13 wherein the holding location display displays at least one indicator representative of status of the respective holding location in the touch sensitive area of the holding location display defining the button, the at least one indicator including at least one of a food amount indicator representing an amount of food held at the respective holding location, a food hold time indicator representing a time food has been held at the respective holding location, and a food type indicator indicating a type of food held at the respective holding location.

D16. A food management control system as set forth in claim D13 wherein the holding location display displays at least two indicators representative of a status of the respective holding location in the touch sensitive area of the holding location display defining the button, the at least two indicators including at least two of a food amount indicator representing an amount of food held at the respective holding location, a food hold time indicator representing a time food has been held at the respective holding location, and a food type indicator indicating a type of food held at the respective holding location.

D17. A food management control system as set forth in claim D13 wherein the holding location display displays at least three indicators representative of status of the respective holding location in the touch sensitive area of the holding location display defining the button, the at least three indicators including a food amount indicator representing an amount of food held at the respective holding location, a food hold time indicator representing a time food has been held at the respective holding location, and a food type indicator indicating a type of food held at the respective holding location.

D18. A food management control system as set forth in claim D1 wherein the holding location display displays only information representative of the status of the holding location in the touch sensitive area of the holding location display defining the button.

D19. A food management control system as set forth in claim D1 wherein the touch sensitive area of the holding location display defining the button is free of any indicator indicating an operation executed in response to the first type of user engagement with the button.

D20. A food management control system as set forth in claim D1 wherein the first type of user engagement is a single engagement with the button.

D21. A food management control system as set forth in claim D20 wherein the first type of user engagement with the button is a sustained press of the button.

D22. A food management control system as set forth in claim D1 wherein the button can be actuated by a second type of user engagement with the button different than the first type of user engagement with the button, and wherein the tangible storage medium includes food management controller executable instructions for executing a third operation in response to the second type of user engagement with the button.

D23. A food management control system as set forth in claim D22 wherein the second type of user engagement with the button is a quick tap and release of the button.

D24. A food management control system as set forth in claim D1 wherein the user interface includes a touch screen display, and the plurality of holding location displays are sections of the touch screen display.

DM1. A computer executable method for use with food holding apparatus having a plurality of holding locations, the method including providing a user interface including a plurality of holding location displays associated with respective holding locations for displaying information associated with the holding locations, the holding location displays being arranged in an array corresponding to an arrangement of the respective holding locations, the holding location displays being positioned in the array corresponding to positions of the respective holding locations in the arrangement, each holding location display including a touch sensitive area defining a button that can be actuated by at least a first type of user engagement with the button, displaying on each holding location display information associated with the status of the respective holding location, executing, with a food management controller, a first operation in response to the first type of user engagement with the button when a first holding location status is displayed on the holding location display, and executing, with the food management controller, a second operation different than the first operation in response to the first type of user engagement with the button when a second holding location status is displayed on the holding location display.

E1. A food management control system for managing food in a food holding apparatus having a plurality of holding locations, the food management control system including a food management controller configured for monitoring status of the plurality of holding locations, a user interface including a plurality of holding location displays associated with respective holding locations for displaying information associated with the holding locations, the holding location displays being arranged in an array corresponding to an arrangement of the respective holding locations and positioned in the array corresponding to positions of the respective first and second holding locations in the arrangement, each holding location display including a touch sensitive area defining a button that can be actuated by at least a first type of user engagement with the button and a second type of user engagement with the button different than the first type of user engagement with the button, a tangible storage medium having food management controller executable instructions stored therein, said instructions, when executed by the food management controller, displaying on each holding location display information associated with the status of the respective holding location, the tangible storage medium storing food management controller executable instructions for executing a first operation in response to the first type of user engagement with the button and for executing a second operation different than the first operation in response to the second type of user engagement with the button.

E2. A food management control system as set forth in claim E1 wherein the first type of user engagement is a single engagement with the button.

E3. A food management control system as set forth in claim E2 wherein the first type of user engagement with the button is a quick tap and release of the button.

E4. A food management control system as set forth in claim E2 wherein the second type of user engagement is a single engagement with the button.

E5. A food management control system as set forth in claim E4 wherein the second type of user engagement with the button is a sustained press of the button.

E6. A food management control system as set forth in claim E1 wherein the first operation executed by the first type of engagement with the button is displaying a prompt window on the user interface, the prompt window including a plurality of buttons.

E7. A food management control system as set forth in claim E6 wherein the second operation executed by the second type of user engagement with the button is the food management processor recording in the tangible storage medium an amount of food as being held at the respective holding location.

E8. A food management control system as set forth in claim E6 wherein the second operation executed by the second type of user engagement with the button is the food management processor transferring association of an amount of food held at the holding location to a different holding location.

E9. A food management control system as set forth in claim E6 wherein the second operation executed by the second type of user engagement with the button is the food management processor changing the holding location status to represent no food is held at the holding location.

E10. A food management control system as set forth in claim E6 wherein the second operation executed by the second type of user engagement with the button is the food management processor changing the holding location status to represent food is held at the holding location.

E11. A food management control system as set forth in claim E1 wherein the second operation executed by the second type of user engagement with the button is the food management processor recording in the tangible storage medium an amount of food as being held at the respective holding location.

E12. A food management control system as set forth in claim E1 wherein the second operation executed by the second type of user engagement with the button is the food management processor transferring association of an amount of food held at the holding location to a different holding location.

E13. A food management control system as set forth in claim E1 wherein the second operation executed by the second type of user engagement with the button is the food management processor changing the holding location status to represent no food is held at the holding location.

E14. A food management control system as set forth in claim E1 wherein the second operation executed by the second type of user engagement with the button is the food management processor changing the holding location status to represent food is held at the holding location.

E15. A food management control system as set forth in claim E1 wherein the button includes a boundary substantially coextensive with the holding location display.

E16. A food management control system as set forth in claim E1 wherein the button includes a boundary indicated on the holding location display by a border.

E17. A food management control system as set forth in claim E1 wherein the holding location display displays information representative of the status of the holding location in the touch sensitive area of the holding location display defining the button.

E18. A food management control system as set forth in claim E17 wherein an appearance of the button when the first holding location status is displayed on the holding location display is substantially the same as an appearance of the button when the second holding location status is displayed on the holding location display except for updating of displayed information representative of the status of the holding location in the touch sensitive area of the holding location display defining the button.

E19. A food management control system as set forth in claim E17 wherein the holding location display displays at least one indicator representative of status of the respective holding location in the touch sensitive area of the holding location display defining the button, the at least one indicator including at least one of a food amount indicator representing an amount of food held at the respective holding location, a food hold time indicator representing a time food has been held at the respective holding location, and a food type indicator indicating a type of food held at the respective holding location.

E20. A food management control system as set forth in claim E17 wherein the holding location display displays at least two indicators representative of status of the respective holding location in the touch sensitive area of the holding location display defining the button, the at least two indicators including at least two of a food amount indicator representing an amount of food held at the respective holding location, a food hold time indicator representing a time food has been held at the respective holding location, and a food type indicator indicating a type of food held at the respective holding location.

E21. A food management control system as set forth in claim E17 wherein the holding location display displays at least three indicators representative of status of the respective holding location in the touch sensitive area of the holding location display defining the button, the at least three indicators including a food amount indicator representing an amount of food held at the respective holding location, a food hold time indicator representing a time food has been held at the respective holding location, and a food type indicator indicating a type of food held at the respective holding location.

E22. A food management control system as set forth in claim E1 wherein the holding location display displays only information representative of the status of the holding location in the touch sensitive area of the holding location display defining the button.

E23. A food management control system as set forth in claim E1 wherein the touch sensitive area of the holding location display defining the button is free of any indicator indicating an operation executed in response to the first type of user engagement with the button.

E24. A food management control system as set forth in claim E1 wherein the user interface includes a touch screen display, and the plurality of holding location displays are sections of the touch screen display.

EM1. A computer executable method for use with a food holding apparatus having a plurality of holding locations, the method including providing a user interface including a plurality of holding location displays associated with respective holding locations for displaying information associated with the holding locations, the holding location displays being arranged in an array corresponding to an arrangement of the respective holding locations and positioned in the array corresponding to positions of the respective first and second holding locations in the arrangement, each holding location display including a touch sensitive area defining a button that can be actuated by at least a first type of user engagement with the button and a second type of user engagement with the button different than the first type of user engagement with the button, displaying on each holding location display information associated with the status of the respective holding location, executing, with a food management controller, a first operation in response to the first type of user engagement with the button, and executing, with the food management controller, a second operation different than the first operation in response to the second type of user engagement with the button.

F1. A food management control system for managing food in a food holding apparatus having at least a first holding location and a second holding location for holding food of a first food type, the food management control system including a food management controller configured for monitoring food expiration times associated with the first and second holding locations, a point of sale device for receiving customer orders, the point of sale device generating a customer order signal representative of a customer order for an amount of the first food type, a user interface including at least first and second holding location displays for displaying information associated with the respective first and second holding locations, a tangible storage medium having food management controller executable instructions stored therein, said instructions, when executed by the food management controller, displaying on the first and second holding location displays food amount indicators representing an amount of food held at the respective holding locations, the tangible storage medium storing food management controller executable instructions for displaying a first food status indicator on one of the first and second holding location displays indicating food held at the holding location associated with said one of the first and second holding location displays should be served first relative to food held at the holding location associated with the other of the first and second holding location displays, wherein the food management controller is in operative communication with the point of sale device for receiving the customer order signal, and the food management controller is responsive to the customer order signal to change the food amount indicator displayed on said one of the first and second holding location displays to represent a reduced amount of food of the first food type held in said one of the first and second holding locations.

F2. A food management control system as set forth in claim F1 wherein the food amount indicators are numbers.

F3. A food management control system as set forth in claim F1 wherein the first food status indicator is a color.

F4. A food management control system as set forth in claim F1 wherein the tangible storage medium includes food management controller executable instructions for displaying on said other of the first and second holding location displays a second food status indicator indicating food held at the holding location associated with said other of the first and second holding location displays should be served second relative to food held at the holding location associated with said one of the first and second holding location displays.

F5. A food management control system as set forth in claim F4 wherein the second food status indicator is a color.

F6. A food management control system as set forth in claim F1 wherein the tangible storage medium includes food management controller executable instructions for displaying the first food status indicator on the holding location display associated with the holding location holding food having the least time until expiration among food held at the first and second holding locations.

F7. A food management control system as set forth in claim F1 wherein the tangible storage medium includes food management controller executable instructions for displaying food type indicators on the first and second holding location displays for indicating the first type of food is held at the first and second holding locations.

F8. A food management control system as set forth in claim F1 wherein the first and second holding location displays are arranged in an array corresponding to an arrangement of the respective first and second holding locations, and the first and second holding location displays are positioned in the array corresponding to positions of the respective first and second holding locations in the arrangement.

F9. A food management control system as set forth in claim F8 wherein the wherein the user interface includes a touch screen display, and the first and second holding location displays are sections of the touch screen display.

What is claimed is:
1. A food management control system for managing food in a food holding apparatus having a first holding location and a second holding location, the food management control system including:
a food management controller configured for monitoring a status of the first holding location and the second holding location, a user interface including a first holding location display associated with the first holding location for displaying information associated with the first holding location and a second holding location display associated with the second holding location for displaying information associated with the second holding location, the first and second holding location displays being arranged in an array corresponding to an arrangement of the respective first and second holding locations, the first and second holding location displays being positioned in the array corresponding to positions of the respective first and second holding locations in the arrangement, the first and second holding location displays each including a touch sensitive area defining a button that can be actuated by at least a first type of user engagement with the button and a second type of user engagement with the button, a non-transitory tangible storage medium having food management controller executable instructions stored therein, said instructions, when executed by the food management controller, displaying on the first holding location display current status of operation information representing a current status of operation of the first holding location, the non-transitory tangible storage medium storing food management controller executable instructions to execute a first operation when a first current status of operation information representing a first current status of operation of the first holding location is displayed on the first holding location display and the button of the first holding location display is actuated by the first type of user engagement, and to execute a second operation different than the first operation when a second current status of operation information representing a second current status of operation of the first holding location is displayed on the first holding location display and the button of the first holding location display is actuated by the first type of user engagement, whether the first or second operation is executed being based on the corresponding first or second status of operation information displayed on the first holding location display when the button of the first holding location display is actuated by the first type of user engagement, wherein the non-transitory tangible storage medium stores food management controller executable instructions to execute an operation different than the first operation when the first current status of operation information is displayed on the first holding location display and the button of the first holding location display is actuated by the second type of user engagement, whether the first operation or said operation different than the first operation is executed when the first current status of operation information is displayed on the first holding location display being based on the corresponding first or second type of user engagement used to actuate the button of the first holding location display;

wherein the first holding location display displays the current status of operation information representative of the current status of operation of the first holding location in the touch sensitive area of the first holding location display defining the button of the first holding location display.

2. The food management control system of claim 1, wherein the first current status of operation information represents that unexpired food is held at the first holding location.

3. The food management control system of claim 1, wherein said operation different than the first operation is different than the second operation.

4. The food management control system of claim 1, wherein said second operation is changing the first holding location display from displaying the second current status of operation information to displaying a current status of operation information different than the second current status of operation information that represents no food is held at the holding location.

5. The food management control system of claim 1, wherein said first type of user engagement is a sustained press.

6. The food management control system of claim 5, wherein said second operation is changing the first holding location display from displaying the second current status of operation information to displaying a current status of operation information different than the second current status of operation information that represents no food is held at the holding location.

7. The food management control system of claim 1, wherein the first type of user engagement is a tap.

8. The food management control system of claim 7, wherein the second type of user engagement is a sustained press.

9. The food management control system of claim 7, wherein said second type of user engagement is a swipe.

10. The food management control system of claim 7, wherein said second type of user engagement is a sustained press and drag.

11. The food management control system of claim 1, wherein said second type of user engagement is a swipe.

12. The food management control system of claim 1, wherein said second type of user engagement is a sustained press and drag.

13. The food management control system of claim 1, wherein the first current status of operation information represents that no food is held at the first holding location.

14. The food management control system of claim 13, wherein the first current status of operation information has a dim appearance.

15. The food management control system of claim 13, wherein the first current status of operation information has a gray appearance.

16. The food management control system of claim 13, wherein the second current status of operation information includes a timer.

17. The food management control system of claim 13, wherein the second current status of operation information represents that food is held at the first holding location.

18. The food management control system of claim 17, wherein the second current status of operation information includes a timer.

19. The food management control system of claim 18, wherein the non-transitory tangible storage medium stores food management controller executable instructions to change a colored appearance of the second current status of operation information based on a time of the timer.

20. The food management control system of claim 19, wherein the colored appearance of the second current status of operation information changes among at least first, second, and third colored appearances, the first colored appearance including green, the second colored appearance including yellow, and the second colored appearance including red.

21. The food management control system of claim 1, wherein the first current status of operation information represents that the first holding location is inactive.

22. The food management control system of claim 21, wherein the first current status of operation information has a dim appearance.

23. The food management control system of claim 21, wherein the first current status of operation information has a gray appearance.

24. The food management control system of claim 1, wherein said first operation is initiating a timer.

25. The food management control system of claim 1, wherein the second current status of operation information represents that food is held at the first holding location.

26. The food management control system of claim 25, wherein the second operation executed by the first type of user engagement is the food management controller transferring association of an amount of food held at the first holding location to the second holding location.

27. The food management control system of claim 1, wherein said second operation includes displaying a prompt screen.

28. The food management control system of claim 1, wherein said operation different than the first operation includes displaying a prompt screen.

29. The food management control system of claim 1, wherein said operation different than the first operation is transferring the first current status of operation information displayed at the first holding location display to the second holding location display.

30. The food management control system of claim 1, wherein said operation different than the first operation is transferring the second current status of operation information displayed at the first holding location display to the second holding location display.

31. The food management control system of claim 1, wherein the non-transitory tangible storage medium stores food management controller executable instructions to display on the first holding location display a food type indicator representing a type of food.

32. The food management control system of claim 31, wherein said operation different than the first operation includes altering the food type indicator displayed on the first holding location display.

33. The food management control system of claim 32, wherein said operation different than the first operation includes altering an appearance of the food type indicator displayed on the first holding location display.

34. The food management control system of claim 1, wherein the first operation executed by the first type of user engagement is the food management controller recording in the non-transitory tangible storage medium an amount of food as being held at the first holding location.

35. The food management control system of claim 1, wherein the second current status of operation information represents an expired hold time associated with the first holding location.

36. The food management control system of claim 35, wherein the second operation executed by the first type of user engagement includes the food management controller changing the second current status of operation information to a different current status of operation information that represents no food is held at the first holding location.

37. The food management control system of claim 35, wherein the second operation executed by the first type of user engagement includes the food management controller changing the second current status of operation information to the first current status of operation information.

38. The food management control system of claim 37, wherein the first current status of operation information represents that no food is held at the first holding location.

39. The food management control system of claim 35, wherein the second operation executed by the first type of user engagement includes the food management controller recording as waste in the non-transitory tangible storage medium an amount of food last held at the first holding location.

40. The food management control system of claim 1, wherein the non-transitory tangible storage medium includes food management controller executable instructions for executing a third operation in response to the first type of user engagement with the button of the first holding location display when a third current status of operation information representing a third current status of operation of the first holding location is displayed on the first holding location display.

41. The food management control system of claim 40, wherein the third current status of operation information represents an expired hold time associated with the first holding location.

42. The food management control system of claim 1, wherein the button of the first holding location display includes a boundary substantially coextensive with the first holding location display.

43. The food management control system of claim 1, wherein the button of the first holding location display includes a boundary indicated on the first holding location display by a border.

44. The food management control system of claim 1, wherein an appearance of the button of the first holding location display when a first holding location status is displayed on the first holding location display is substantially the same as an appearance of the button of the first holding location display when a second holding location status is displayed on the first holding location display except for updating of displayed current status of operation information representative of the current status of operation of the first holding location in the touch sensitive area of the first holding location display defining the button.

45. The food management control system of claim 1, wherein the first holding location display displays at least one indicator representative of current status of operation of the first holding location in the touch sensitive area of the first holding location display defining the button, the at least one indicator including at least one of a food amount indicator representing an amount of food held at the first holding location, a food hold time indicator representing a time food has been held at the first holding location, and a food type indicator indicating a type of food held at the first holding location.

46. The food management control system of claim 45, wherein the second current status of operation information includes the at least one indicator.

47. The food management control system of claim 46, wherein the first current status of operation information includes the at least one indicator.

48. The food management control system of claim 46, wherein the first current status of operation information is free of the at least one indicator.

49. The food management control system of claim 1, wherein the first holding location display displays first and second indicators representative of current status of operation of the first holding location in the touch sensitive area of said first holding location display defining the button, the first indicator comprising a food amount indicator representing an amount of food held at the first holding location, a food hold time indicator representing a time food has been held at the first holding location, or a food type indicator indicating a type of food held at the first holding location; and the second indicator being different from the first indicator and comprising a food amount indicator representing an amount of food held at the first holding location, a food hold time indicator representing a time food has been held at the first holding location, or a food type indicator indicating a type of food held at the first holding location.

50. The food management control system of claim 49, wherein the second current status of operation information includes the first and second indicators.

51. The food management control system of claim 50, wherein the first current status of operation information includes at least one of the first or second indicators.

52. The food management control system of claim 50, wherein the first current status of operation information is free of the first and second indicators.

53. The food management control system of claim 49, wherein the first and second indicators comprise the food hold time indicator and the food type indicator.

54. The food management control system of claim 53, wherein the second current status of operation information includes the food hold time indicator and the food type indicator.

55. The food management control system of claim 54, wherein the first current status of operation information includes the food type indicator.

56. The food management control system of claim 55, wherein the first current status of operation information is free of the food hold time indicator.

57. The food management control system of claim 1, wherein the first holding location display displays first, second, and third indicators representative of current status of operation of the first holding location in the touch sensitive area of the first holding location display defining the button, the first indicator comprising a food amount indicator representing an amount of food held at the first holding location, the second indicator comprising a food hold time indicator representing a time food has been held at the first holding location, and the third indicator comprising a food type indicator indicating a type of food held at the first holding location.

58. The food management control system of claim 57, wherein the second current status of operation information includes the first, second, and third indicators.

59. The food management control system of claim 58, wherein the first current status of operation information includes at least one of the first, second, or third indicators.

60. The food management control system of claim 59, wherein the first current status of operation information is free of the other of the at least one of the first, second, or third indicators.

61. The food management control system of claim 1, wherein the first holding location display displays only current status of operation information representative of the current status of operation of the first holding location in the touch sensitive area of the first holding location display defining the button.

62. The food management control system of claim 1, wherein the touch sensitive area of the first holding location display defining the button is free of any indicator indicating an operation executed in response to the first type of user engagement with the button of the first holding location display.

* * * * *